US010091496B2

(12) United States Patent
DeVaul et al.

(10) Patent No.: US 10,091,496 B2
(45) Date of Patent: Oct. 2, 2018

(54) SYSTEMS, DEVICES, AND METHODS FOR CALIBRATING A LIGHT FIELD PROJECTION SYSTEM

(71) Applicant: X Development LLC, Mountain View, CA (US)

(72) Inventors: Richard DeVaul, Menlo Park, CA (US); Brian Adolf, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 140 days.

(21) Appl. No.: 15/361,641

(22) Filed: Nov. 28, 2016

(65) Prior Publication Data

US 2018/0152697 A1    May 31, 2018

(51) Int. Cl.
| | | |
|---|---|---|
| H04N 9/31 | (2006.01) | |
| G03B 21/60 | (2014.01) | |
| G03B 21/602 | (2014.01) | |
| H04N 13/327 | (2018.01) | |

(52) U.S. Cl.
CPC .......... *H04N 13/327* (2018.05); *H04N 9/315* (2013.01); *H04N 9/3129* (2013.01)

(58) Field of Classification Search
None
See application file for complete search history.

(56) References Cited

U.S. PATENT DOCUMENTS

| | | |
|---|---|---|
| 4,978,202 A | 12/1990 | Yang |
| 5,483,254 A | 1/1996 | Powell |
| 6,600,600 B2 | 7/2003 | Chen |
| 7,283,308 B2 | 10/2007 | Cossairt et al. |
| 7,746,559 B2 | 6/2010 | Sharon et al. |
| 7,929,207 B2 | 4/2011 | Yonekubo et al. |

(Continued)

OTHER PUBLICATIONS

International Search Report and Written Opinion issued in International Application No. PCT/US2017/062948, dated Mar. 8, 2018, 11 pages.

(Continued)

*Primary Examiner* — Anand S Rao
*Assistant Examiner* — Tyler B Edwards
(74) *Attorney, Agent, or Firm* — Fish & Richardson P.C.

(57) ABSTRACT

The present disclosure relates to systems, devices, and methods for calibrating a light field projection system. One example system includes a projection unit operable to project a scanning sequence toward a screen having convex reflective elements. The scanning sequence is modulated according to a baseline intensity profile. The system also includes a calibration device disposed such that a portion of the scanning sequence is intercepted by the calibration device. The calibration device includes a first light detector arranged to detect an intercepted intensity profile. The calibration device also includes a second light detector arranged to detect a reflected portion of the scanning sequence as a measured intensity profile. The system further includes a control system. The control system is configured to determine an expected intensity profile and to modify operation of the light field projection system based on a comparison of the measured intensity profile to the expected intensity profile.

20 Claims, 23 Drawing Sheets

(56) References Cited

U.S. PATENT DOCUMENTS

| | | |
|---|---|---|
| 8,497,934 B2 | 7/2013 | Milnes et al. |
| 2002/0006213 A1 | 1/2002 | Doudnikov et al. |
| 2009/0273662 A1 | 11/2009 | Lucente |
| 2012/0113097 A1* | 5/2012 | Nam .................. H04N 13/383 345/419 |
| 2012/0127320 A1 | 5/2012 | Balogh |
| 2012/0176665 A1* | 7/2012 | Song ................ G02B 27/2242 359/298 |
| 2012/0262544 A1 | 10/2012 | Damera-Venkata et al. |
| 2012/0287502 A1 | 11/2012 | Hajjar |
| 2013/0120714 A1 | 5/2013 | Nishioka et al. |
| 2014/0240809 A1* | 8/2014 | Lapstun ............. H04N 13/0402 359/198.1 |
| 2014/0253993 A1* | 9/2014 | Lapstun ............. H04N 13/0402 359/199.3 |
| 2014/0300869 A1 | 10/2014 | Hirsch et al. |
| 2015/0199838 A1* | 7/2015 | Itoh ........................ G06T 15/06 345/426 |
| 2016/0006914 A1 | 1/2016 | Neumann |
| 2016/0037146 A1 | 2/2016 | McGrew |
| 2016/0085084 A1 | 3/2016 | Masson et al. |
| 2016/0116647 A1 | 4/2016 | Masson et al. |
| 2016/0139402 A1* | 5/2016 | Lapstun .................. G02B 6/34 349/193 |
| 2016/0246165 A1 | 8/2016 | Wang |
| 2016/0291545 A1 | 10/2016 | Fan |

OTHER PUBLICATIONS

U.S. Appl. No. 15/178,685, filed Jun. 10, 2016; inventors: Brian Adolf, Richard DeVaul.
U.S. Appl. No. 15/297,579, filed Oct. 19, 2016; inventors: Richard DeVaul, Brian Adolf.

* cited by examiner

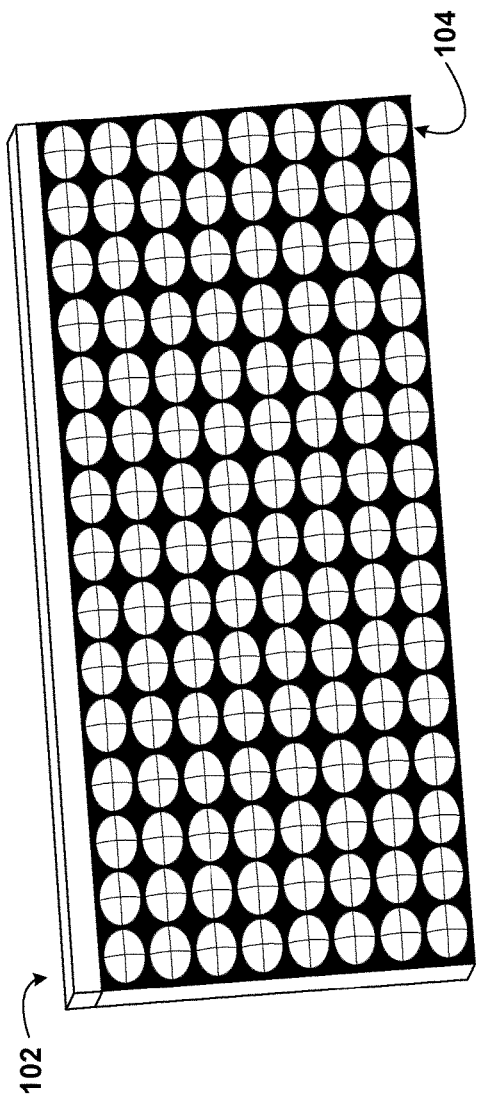
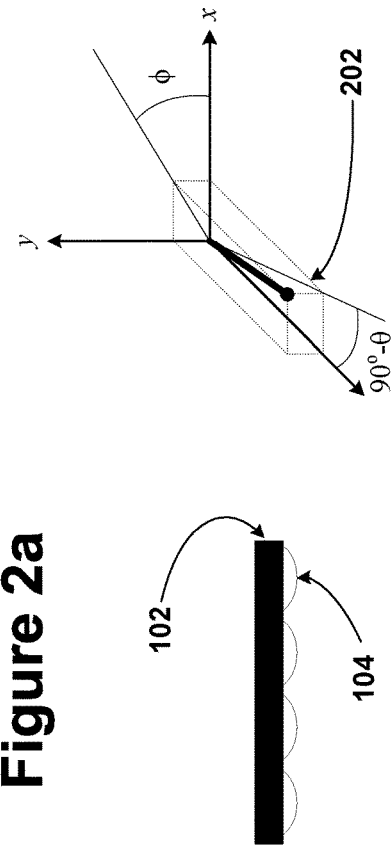
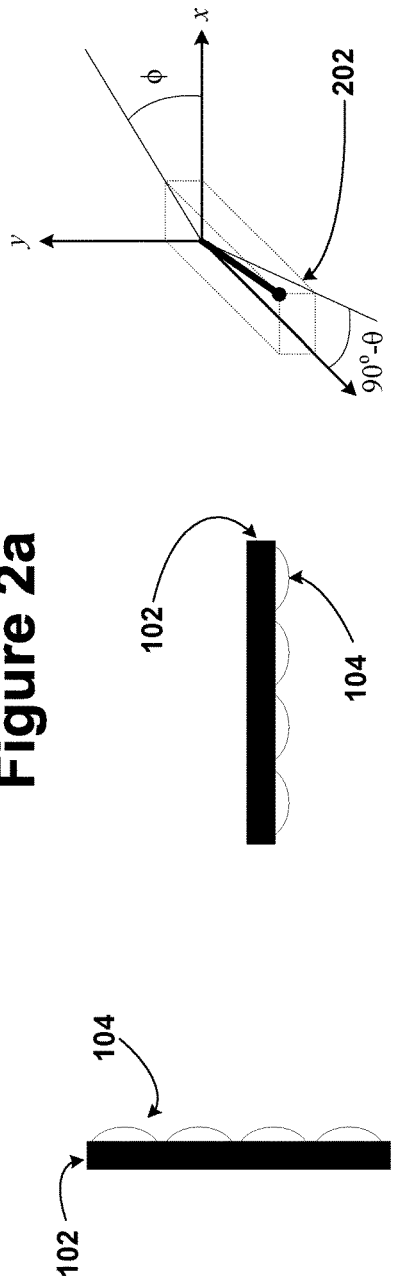
Figure 2a
Figure 2b
Figure 2c
Figure 2d

SYSTEMS, DEVICES, AND METHODS FOR CALIBRATING A LIGHT FIELD PROJECTION SYSTEM

BACKGROUND

Unless otherwise indicated herein, the materials described in this section are not prior art to the claims in this application and are not admitted to be prior art by inclusion in this section.

Three-dimensional (3D) displays/projections have become a topic of much interest in recent years. Many 3D displays require the cumbersome use of a headset (e.g., active or passive 3D glasses) by the viewer. Further, while glasses-less 3D display systems do exist, such systems may not allow for multiple viewers at different azimuthal viewing angles, elevations, and distances from the display.

A light field is a function (sometimes referred to as the "5D plenoptic function") that describes the composite of the amount of light flowing in a given direction at a given location for every location in space. If all the light that comprises a light field is emanating from one plane, for example, the function can be reduced to four dimensions. An example basis set of those four dimensions may be an x-location on the plane, a y-location on the plane, an azimuthal angle (from 0°-360°) in the plane (sometimes called $\phi$), and an elevation angle (from 0°-90°, 0° being in the plane, 90° being exactly normal to the plane) out of the plane (sometimes called $\theta$). If an intensity, in Watts for example, is specified for each possible quadruple (x, y, $\phi$, and $\theta$) at the plane (assuming the plane to be infinite in x and y directions), then a light field can be defined for every point in 3D space (barring interference with objects outside of the plane).

A light field display can generate such a light field, subject to practical limitations (e.g., the display plane is not infinite in x and y directions). The more granular the selection of values for each of the four dimensions, the higher the resolution of the viewable light field that is displayed. Additionally, the intensity of the light field displayed may only be defined for a single wavelength. Therefore, a number of light fields may be separately displayed at different wavelengths. In the visible spectrum, each wavelength represents the color of the respective light field, thereby enabling color light field displays.

A viewer may view the light field generated by a light field display from various locations in space and from various azimuthal and elevation angles. Given that a viewer has two eyes (and therefore two perspectives) from which to observe the light field, a viewer can spectroscopically observe the scene coming from the light field display in 3D.

Such a light field display may be offset when installed in a home, for example. Additionally or alternatively, the light field display may have defects that arise during fabrication. Such offsets or defects may result in the system not producing high quality light fields at certain viewing angles/observation locations. To an observer, a lower quality light field could yield a degraded 3D image of the scene that is being reproduced (e.g., a low resolution 3D image). Therefore, accounting for potential offsets and defects via calibration can be desirable.

SUMMARY

The specification and drawings disclose embodiments that relate to systems, devices, and methods for calibrating a light field projection system. One example system provides for the calibration of a light field projection system. The system includes a projection unit that projects light toward a screen to sequentially scan the screen. The screen has convex reflective elements thereon. Further, the projected light is modulated according to a baseline intensity profile. The system also includes a calibration device. The calibration device is between the projection unit and the screen during the calibration process, and may intercept a portion of the projected light during the calibration process. Additionally, the calibration device includes a first light detector and a second light detector. The first light detector detects the intercepted portion. The second light detector detects a portion of the projected light reflected from the screen. The light detected by the first light detector is in the form of an intercepted intensity profile and the light detected by the second light detector is in the form of a measured intensity profile. The system lastly includes a control system. The control system uses the baseline intensity profile and the intercepted intensity profile to determine an expected intensity profile for the second light detector. The control system also modifies operation of the light field projection system in response to a comparison between the measured intensity profile and the expected intensity profile.

In one aspect the disclosure describes a system configured to calibrate a light field projection system. The system includes a projection unit operable to project a scanning sequence toward a screen having a plurality of convex reflective elements. The projected scanning sequence is modulated according to a baseline intensity profile. The system also includes a calibration device disposed between the projection unit and the screen such that a portion of the scanning sequence is intercepted by the calibration device before reaching the screen. The calibration device includes: (a) a first light detector arranged to detect the intercepted portion of the scanning sequence as an intercepted profile, and (b) a second light detector arranged to detect a reflected portion of the scanning sequence that is reflected from the screen as a measured intensity profile. The system further includes a control system. The control system is configured to determine, based on the baseline intensity profile and the intercepted intensity profile, an expected intensity profile corresponding to the second light detector. The control system is also configured to modify operation of the light field projection system based on a comparison of the measured intensity profile to the expected intensity profile.

In another aspect the disclosure describes a device configured to calibrate a light field projection system. The device includes a first light detector arranged to detect an intercepted portion of a scanning sequence as an intercepted intensity profile. The scanning sequence is projected by a projection unit toward a screen having a plurality of convex reflective elements. The projected scanning sequence is modulated according to a baseline intensity profile. The device also includes a second light detector arranged to detect a reflected portion of the scanning sequence that is reflected from the screen as a measured intensity profile. The device further includes a transmitter configured to transmit the measured intensity profile and the intercepted intensity profile to a control system. The control system is configured to determine, based on the baseline intensity profile and the intercepted intensity profile, an expected intensity profile corresponding to the second light detector. The control system is also configured to modify operation of the light field projection system based on a comparison of the measured intensity profile to the expected intensity profile.

In a third aspect the disclosure describes a method of calibrating a light field projection system. The method includes modulating, by a modulator of a projection unit, a scanning sequence according to a baseline intensity profile. The method also includes projecting, by the projection unit, the scanning sequence toward a screen having a plurality of convex reflective elements. The method further includes intercepting, by a calibration device disposed between the projection unit and the screen, a portion of the scanning sequence. In addition, the method includes detecting, by a first light detector, the intercepted portion of the scanning sequence as an intercepted intensity profile. Still further, the method includes detecting, by a second light detector, a reflected portion of the scanning sequence that is reflected from the screen as a measured intensity profile. Additionally, the method includes determining, by a control system based on the baseline intensity profile and the intercepted intensity profile, an expected intensity profile corresponding to the second light detector. Even further, the method includes modifying, by the control system, operation of the light field projection system based on a comparison of the measured intensity profile to the expected intensity profile.

In an additional aspect the disclosure describes a system of calibrating a light field projection system. The system includes a means for modulating a scanning sequence according to a baseline intensity profile. The system also includes a means for projecting the scanning sequence toward a screen having a plurality of convex reflective elements. The system further includes a means for intercepting a portion of the scanning sequence. In addition, the system includes a first means for detecting the intercepted portion of the scanning sequence as an intercepted intensity profile. Still further, the system includes a second means for detecting a reflected portion of the scanning sequence that is reflected from the screen as a measured intensity profile. Additionally, the system includes a means for determining, based on the baseline intensity profile and the intercepted intensity profile, an expected intensity profile corresponding to the second means for detecting. Even further, the system includes a means for modifying operation of the light field projection system based on a comparison of the measured intensity profile to the expected intensity profile.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 2a-2d are illustrations of a screen (angled view, side view, top view, and a coordinate system, respectively), according to example embodiments.

DETAILED DESCRIPTION

Figure 1:
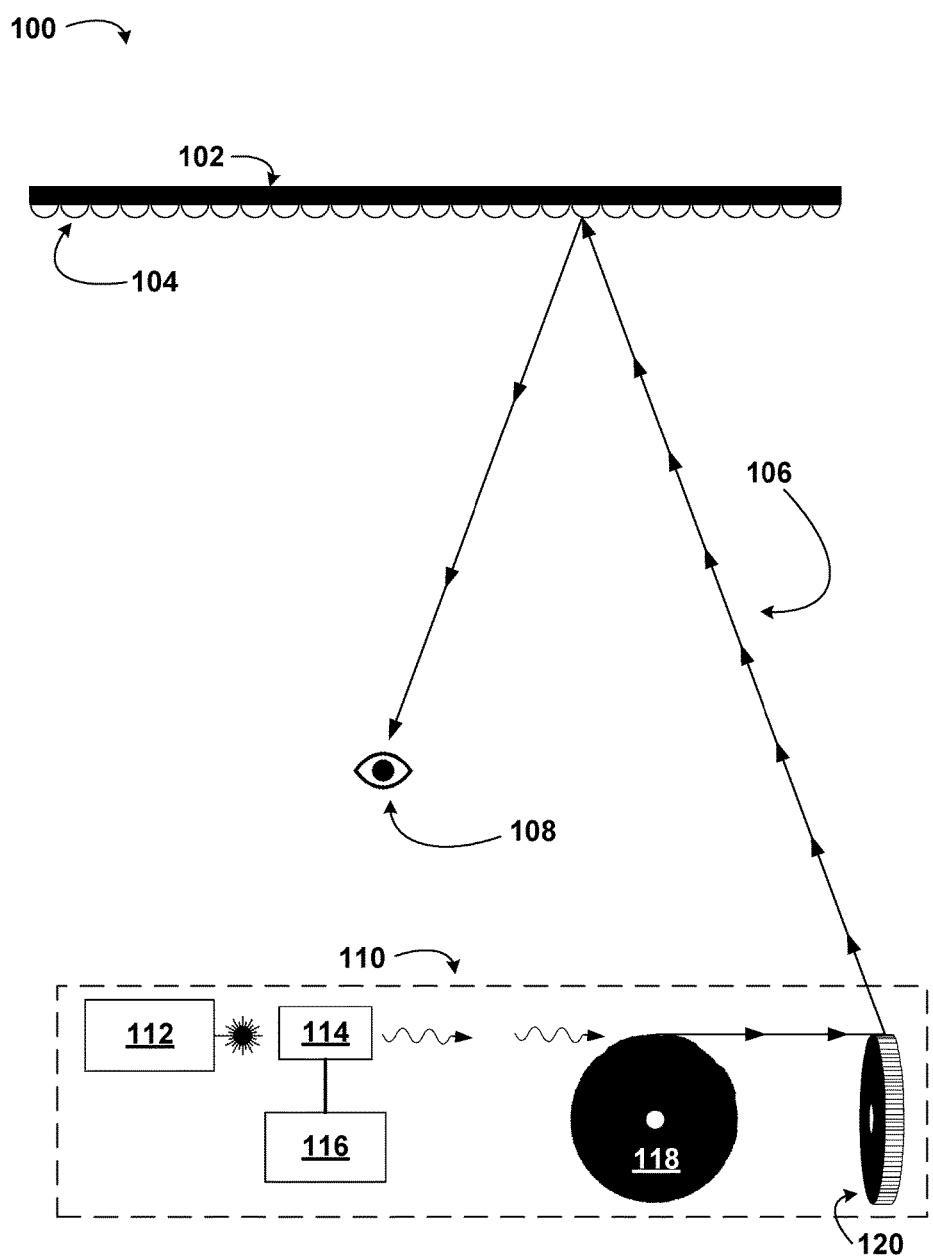
FIG. 1 is an illustration of a light field projection system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

Example embodiments include systems, devices, and methods for calibrating a light field projection system. The light field projection system may include a screen having convex reflective elements, in some embodiments. In other embodiments, the screen may have concave refractive elements.

A method of calibrating the light field projection system may include using a calibration device (e.g., of a calibration system) placed in between the screen and a projection unit (e.g., of a calibration system and/or of the light field projection system). Such a calibration device may be carried by a user (e.g., a wand in a user's hand) or mounted to the projection unit during the calibration method, in various embodiments. On a side of the calibration device that faces the screen, there may be one or more light detectors (e.g., photodiodes, avalanche photodiodes, or photoresistors). The light detectors may each detect measured intensity profiles reflected from the convex reflective elements on the screen during a sequential scan of the screen by the projection unit. Further, during the sequential scan of the screen, the projection unit may modulate the projected light according to a baseline intensity profile. The baseline intensity profile may provide a baseline against which variations in the measured intensity profiles can later be compared.

The calibration device may include an additional light detector on a side of the calibration device that faces the projection unit. The additional light detector may intercept a portion of the projected light before it reaches the screen, such that an intensity profile may be determined from the intercepted light. Further, this intercepted intensity profile may be determined during the sequential scan of the screen by the projection unit. The intercepted intensity profile and the baseline intensity profile can then be used to determine an expected (e.g., predicted) intensity profile of the portion of the scanning sequence that reflects off the screen and is detected by the screen-facing light detector(s).

Furthermore, the intercepted light intensity profile may be used to determine the location of the calibration device, and thus the location of the screen-facing light detector(s), relative to the projection unit and/or the screen. Once the relative location of the calibration device is determined, the expected intensity profile(s) can be compared to the measured intensity profile(s) detected by the screen-facing detector(s). In particular, a correlation between the measured intensity profile(s) and the expected intensity profile(s) detected at the screen-facing detector(s).

The calibration device may further include a transmitter. The transmitter may be used to relay the measured intensity profile(s) or the intercepted intensity profile to a control system (e.g., the control system used by the projection unit of the light field projection system to project light fields concurrently viewable from a plurality of perspectives). The control system may also control the projection unit to project a light field modulated according to the baseline intensity profile during the sequential scan of the screen.

Upon receiving the measured intensity profile(s) and the intercepted intensity profile, the control system may determine the expected intensity profile(s). The control system may then compare the measured intensity profile(s) to the expected intensity profile(s) to determine if the light field projection system needs to be altered or corrected via the calibration process.

For example, if one of the expected intensity profile(s) has a light intensity of a certain value at a specific time point (e.g., 500 ps), and the measured intensity profile corresponding to that expected intensity profile has the equivalent value of light intensity at a different time point (e.g., 495 ps), the light field projection system may be modified to account for this. For example, the light field projection system may alter a light field modulation scheme used to project a light field using the light field projection system by adding a time delay into the light field modulation scheme (e.g., a time delay of 5 ps). Additionally or alternatively, time delays may be removed from the modulation scheme or the light intensity or wavelength at different times in the modulation scheme may be increased or decreased.

The above described calibration method can calibrate for as many perspectives relative to the screen, in one sequential scan of the screen, as there are corresponding measured and expected intensity profiles. That is to say, the above described calibration method can calibrate for as many perspectives relative to the screen as there are light detectors that detect measured intensity profiles. Each perspective corresponding to one of the second light detectors can be calibrated simultaneously using one sequential scan of the screen. Additional perspectives can therefore be calibrated by moving the calibration device to a different location, and thus a different set of perspectives, relative to the screen, and re-performing the above described calibration.

Further, the light field projection system may perform continuous calibration during viewing, by viewers, of light fields projected by the light field projection system. Such continuous calibration may be done for only those perspectives at which viewers are currently located (e.g., by placing one or more calibration devices on a viewer, such as calibration devices built into viewer glasses, for example). The continuous calibration may be done using light not within the visible spectrum (e.g., in the infrared, using light having a wavelength between 750 and 2,500 nm) so as not to disturb the concurrent viewing of the light field by the viewers.

In some applications, the calibration methods described herein may be used in a fabrication facility of the screens of the light field projection system. For example, the calibration may be done to perform quality assurance of the convex reflective elements and the screen. Additionally or alternatively, the calibration methods may be used upon installation of the light field projection system prior to viewing a light field projected by the light field projection system. As described above, the calibration methods may also be performed concurrently with projection of light fields by the light field projection system. This may be done to continually ensure optimized light field viewing quality.

In the following accompanying figures and description, FIGS. 1-13 illustrate example embodiments relating to a light field projection system, and FIGS. 14-18 illustrate example embodiments relating to a method of calibrating a light field projection system.

II. Example Light Field Projection Systems

FIG. 1 is an illustration of a light field projection system 100, according to example embodiments. The light field projection system 100 includes a screen 102 and a projection unit 110. The screen has a plurality of convex reflective elements 104 arranged in a two-dimensional array thereon. The projection unit 110 projects a plurality of light rays 106 toward the screen 102. The light rays 106 may be reflected off the screen toward an observer 108 In addition, the projection unit 110 comprises a light source 112, a modulator 114, a control system 116, a horizontally rotating movable mirrored element 118, and a vertical rotating movable mirrored element 120.

The screen 102 has a surface on which the convex reflective elements 104 are disposed. In some embodiments, the convex reflective elements 104 will be molded into the screen 102 or stamped into the screen 102 by a machining process. Alternatively, the convex reflective elements 104 may be independently fabricated and adhered to the surface of the screen 102. The screen 102 may loosely resemble rigid bubble-wrap.

The screen 102 may be made of a non-rigid material, such as a polymer or a plastic. This may allow the screen 102 to be rolled or folded when not in use, for example. In other embodiments, the screen 102 may be made of a substantially rigid material, such as glass. The screen 102 is further illustrated in FIGS. 2a-2c and further described in the accompanying description.

The convex reflective elements 104 are disposed on or embedded in the surface of the screen 102. The convex reflective elements 104 serve to reflect light rays projected toward the screen 102 by the projection unit 110. The plurality of convex reflective elements 104 may have mirrored surfaces. For example, each convex reflective element 104 may be a glass substrate coated with silver or aluminum. In addition, the plurality of convex reflective elements 104 may be substantially hemispherical, having a diameter greater than the width of the light rays projected by the projection unit 110 (e.g., greater than the beam waist of the respective laser if the light source 112 is a laser). In some example embodiments, the diameter of each of the convex reflective elements 104 may be roughly equivalent to ten wavelengths of the light projected by the projection unit (e.g., 5 µm).

In alternate embodiments, the convex reflective elements 104 may resemble squashed hemispheres. Because it is unnecessary for the convex reflective elements 104 to reflect light horizontally toward other convex reflective elements 104, it is unnecessary to have the regions of the convex reflective elements closest to the surface of the screen 102 (i.e., the "edges" of the convex reflective elements 104) be perfectly vertical.

In some embodiments, the plurality of convex reflective elements 104 may be more or less identical in shape regardless of their position in the two-dimensional array. Alternatively, the shape of each of the plurality of convex reflective elements 104 may depend on its location within the two-dimensional array. For example, the convex reflective elements 104 that are located nearer to the edges of the array may be more peaked, allowing for the reflection angle to be greater over a wider facial area of the convex reflective elements 104, thereby having the ability to reflect light toward the center of a viewing region in front of the screen 102 from a larger range of locations on its face. Likewise, the vertical dimension and the horizontal dimension of the plurality of convex reflective elements 104 may not be equal for an individual convex reflective element 104. Furthermore, the vertical and/or the horizontal dimensions may vary for different convex reflective elements 104 at different locations within the two-dimensional array.

The plurality of convex reflective elements 104 may additionally be faceted, rather than have a uniformly smooth surface. Potential designs and shapes of the convex reflective elements 104 are illustrated and discussed further with regard to FIGS. 3a-3d.

The observer 108/the light path 106 are illustrated in FIG. 1 to show one potential location relative to the light field projection system 100 in which they may reside. The projection unit 110 projects light toward the screen 102 to sequentially scan the two-dimensional array of convex reflective elements 104. The light projected toward the screen is then reflected by the plurality of convex reflective elements 104 to generate a light field viewable at a plurality of perspectives. The observer 108 may be located at one of the perspective locations. Thus, the observer 108 is able to observe the light field generated by the light field projection system 100 at the observer's respective quadruple within the light field (i.e., at a given x-location, y-location, φ-angle, and θ-angle relative to the screen 102).

The projection unit 110 comprises sub-units that project light toward the screen 102. In some embodiments, the projection unit 110 may be packaged within a singular housing. Alternatively, the projection unit 110 may utilize free space optics to link the various components comprising the projection unit 110. For example, the light source 112 may output light that is reflected by a mirror or focused by a lens prior to entering the modulator 114. Additionally, multiple components of the projection unit 110 could be located inside or behind the screen 102 with respect to the observer, in various embodiments.

The light source 112 may include a white light source, for example. The light source 112 may also include a lens for focusing the light generated by the light source 112 prior to the light being transmitted to the modulator 114. Furthermore, the light source 112 may include an optical filter to select specific wavelengths of light from the original source. For example, if the light source 112 includes a white light source, there may be an optical filter that only passes light in the range of red wavelengths in the optical spectrum so the light source 112 performs as a red light source.

In other embodiments, the light source 112 may be a laser, such as a fiber laser or a diode laser. This may permit specific colors to be projected by the projection unit 110 without a need for additional optics. Also, in embodiments where the light source 112 is a laser, the light could be tightly spatially focused before leaving the projection system 110, allowing for high resolution light fields reflected from the screen 102.

The modulator 114 alters the light generated by the light source 112. In some embodiments, the modulator 114 may alter the intensity of the light generated by the light source 112. The modulator 114 may do so, for example, according to a modulation scheme determined by the control system 116. The modulator 114 may be an electro-optic modulator in various embodiments (e.g., a Kerr cell, a Pockels cell, or a Mach-Zehnder interferometer). The modulator 114 may, in alternate embodiments, utilize multiple modulation schemes that are multiplexed with one another in time or combined in amplitude to allow for a greater variation in the intensity of the light output by the modulator 114 or to permit a greater dynamic range in that light. Alternatively or additionally, the light source 112 may modulate the light output by the light source 112.

The control system 116 determines the modulation scheme for use by the modulator 114. The control system 116 may determine the modulation scheme in order to produce a light field viewable at the perspective of the observer 108, for example. The control system 116 may be integrated into the projection unit 110, as illustrated in FIG. 1. Alternatively, the control system 116 may be integrated into the screen 102 or a separate device that is communicatively coupled to the projection unit 110. In some embodiments, the control system 116 may include one or more processing units, such one or more central processing units (CPUs). Additionally or alternatively, the control system 116 may include one or more special purpose processing units, such as application specific integrated circuits (ASICs) or GPUs. The control system 116 may also include a non-volatile memory that stores instructions executable by one or more processing units and/or a volatile memory (e.g., random access memory—RAM) that aids one or more processing units in determining the modulation scheme.

In some embodiments, the control system 116, itself, may modulate the modulator 114 using the modulation scheme. In alternate embodiments, the modulation scheme determined by the control system 116 may be transmitted to the modulator 114 and carried out by the modulator 114. The modulation scheme may be rendered by the control system 116 based on an input scene. Furthermore, the modulation scheme may include renderings of different perspectives of the light field from different processing units. The separate rendered perspectives may then be multiplexed or superimposed by the control system 116 to form the modulation scheme that ultimately drives the modulator 114.

The horizontally rotating movable mirrored element 118 may define the horizontal location on the screen 102 at which the light from the light source 112 is aimed. In some embodiments, the horizontally rotating movable mirrored element 118 may be a thin cylinder with facets around the circumference (e.g., one facet for each horizontal location along the screen 102 to which the light will be directed). Each facet may have a planar mirror mounted on its exterior to reflect the light leaving the modulator 114. Furthermore, each facet may be oriented at a slightly different angle with respect to the horizontal axis of the screen 102 so as to reflect the light toward a slightly different horizontal location. In some embodiments, the horizontally rotating movable mirrored element 118 may rotate about magnetic bearings, which enable a high rotational velocity with low friction, and thus without the concern of heat generation and/or mechanical wear to the horizontally rotating movable mirrored element 118.

In some embodiments, the horizontally rotating movable mirrored element 118 may be driven by the control system 116. Alternatively, the horizontally rotating movable mirrored element 118 may independently rotate and a modulation scheme determined by the control system 116 and utilized by the modulator 114 may be synchronized to the rotation of the horizontally rotating movable mirrored element 118.

The vertically rotating movable mirrored element 120 may define the vertical location on the screen 102 at which the light from the light source 112 is aimed. In some embodiments, the vertically rotating movable mirrored element 120 may be a thin cylinder with facets around the circumference (e.g., one facet for each vertical location along the screen 102 to which the light will be directed). Each facet may have a planar mirror mounted on its exterior to reflect the light leaving the modulator 114. Furthermore, each facet may be oriented at a slightly different angle with respect to the vertical axis of the screen 102 so as to reflect the light toward a slightly different vertical location. In some embodiments, the vertically rotating movable mirrored element 120 may rotate about magnetic bearings, which enable a high rotational velocity with low friction, and thus without the concern of heat generation and/or mechanical wear to the vertically rotating movable mirrored element 120.

In some embodiments, the vertically rotating movable mirrored element 120 may be driven by the control system 116. Alternatively, the vertically rotating movable mirrored element 120 may independently rotate and a modulation scheme determined by the control system 116 and utilized by the modulator 114 may be synchronized to the rotation of the vertically rotating movable mirrored element 120.

As illustrated in FIG. 1, the superposition of a first respective facet on the horizontally rotating movable mirrored element 118 and a second respective facet on the vertically rotating movable mirrored element 120 off of which a light ray is reflected may determine a specific location on the screen 102 toward which the light ray is reflected. Such a light ray may contribute to generating a portion of a light field, for example.

The horizontally rotating movable mirrored element 118 and the vertically rotating movable mirrored element 120 may rotate about axes that are perpendicular to one another (as shown in FIG. 1). Alternatively, the horizontally rotating movable mirrored element 118 and the vertically rotating movable mirrored element 120 may rotate about parallel axes and have facets angled in such a way as to account for the parallel axially rotation (e.g., the facets on the horizontally rotating movable mirrored element 118 are angled in a planar fashion from left to right and the facets on the vertically rotating movable mirrored element 120 are angled in a planar fashion from top to bottom).

In some embodiments, a single movable mirrored element may be used rather than a composition of a horizontally rotating movable mirrored element 118 and a vertically rotating movable mirrored element 120. For example, a cylinder with facets around the circumference may be used, each facet having a planar mirror that has a slightly different angle with respect to the horizontal axis of the screen 104 and a slightly different angle with respect to the vertical axis of the screen 102. In this way, an array of locations on the screen 102 may have light reflected toward them from the projection unit 110 using a single movable mirrored element. In alternate embodiments, alternate means of sequentially scanning the convex reflective elements 104 by reflection of light from the light source 112 may be used in place of the movable mirrored elements 118/120.

The components of the light field projection system 100 are configured to produce a light field viewable from one or more perspectives of the observer 108. The light field, if viewed stereoscopically from two perspectives of the observer 108, may create a 3D view of a scene. Further, the light field projection system 100 may produce a light field viewable from perspectives of additional observers. Additionally, the light field produced by the light field projection system 100 may allow the observer 108 to move to various locations to view the scene recreated by the light field from various perspectives.

FIG. 2a is an angled view of the screen 102 and the plurality of convex reflective elements 104 thereon. The dotted lines on the plurality of convex reflective elements 104 serve to depict the three-dimensionality of the convex reflective elements 104 (i.e., the convex reflective elements 104 may have a substantially hemispherical shape, and therefore have a depth). The screen 102 may have many more rows and/or columns than depicted in FIG. 2a. FIG. 2a is provided as an example. Furthermore, adjacent rows of convex reflective elements may be off-set from one another, and similarly for adjacent columns. There may additionally be black/dark space (i.e., portions of the screen 102 that do not reflect light) between adjacent convex reflective elements. Such black/dark space may ensure that, if the screen is sequentially scanned by a projection unit 110 (as illustrated in FIG. 1), any extraneous light rays that do not contribute to the generation of a light field are not reflected from the screen. Therefore, such extraneous light rays will not interfere with or obscure the light field for an observer. In some embodiments, the spacing between adjacent convex reflective elements 104 may be different in the horizontal direction than in the vertical direction.

One method of fabricating the screen 102 and the convex reflective elements 104 thereon may include injection molding. The entire screen 102, including the convex reflective elements 104, may be injection molded as one piece. Alternatively, the convex reflective elements 104 may be fabricated individually using injection molding and then adhered to the face of the screen 102 to form the array.

FIG. 2b is a partial side view illustration of the screen 102. Four of the rows of the plurality of convex reflective elements 104 in the two-dimensional array are shown.

FIG. 2c is a partial top view illustration of the screen 102. Four of the columns of the plurality of convex reflective elements 104 in the two-dimensional array are shown.

As can be seen from the example embodiments of FIGS. 2b and 2c, the convex reflective elements 104 may not be exactly hemispherical. The shape illustrated in FIGS. 2b and 2c may prevent light from being reflected amongst one or more of the convex reflective elements. Such reflections may be unnecessary or even degrade the quality of the light field output by the light field projection system. Additional shapes are possible, in various embodiments; some of which are depicted in FIGS. 3a-3d.

FIG. 2d illustrates a possible coordinate system with respect to the screen 102 that defines light field quadruples (x, y, ϕ, and θ). For instance, the 4 coordinates of the quadruple may represent one light ray 202 reflected from one of the convex reflective elements 104 to produce the light field. The horizontal axis, in the plane of the screen, may represent the x-coordinate along the screen (with positive x being toward the right). Similarly, the vertical axis, in the plane of the screen, may represent the y-coordinate along the screen (with positive y being toward the top). The angle in the plane of the screen 102 (i.e., the azimuthal angle) may range from 0 to 360 degrees counterclockwise, beginning in the first quadrant of the x-y plane. The angle of the quadruple normal to the screen 102 (i.e., the elevation angle) may range from 90 degrees (exactly normal to the plane of the screen 102) to 0 degrees (exactly parallel to the plane of the screen 102).

Figure 3B:
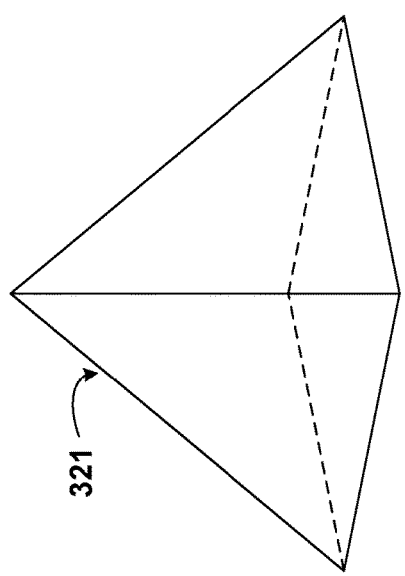
FIGS. 3a-3d are illustrations of various convex reflective elements, according to example embodiments.
Figure 3D:
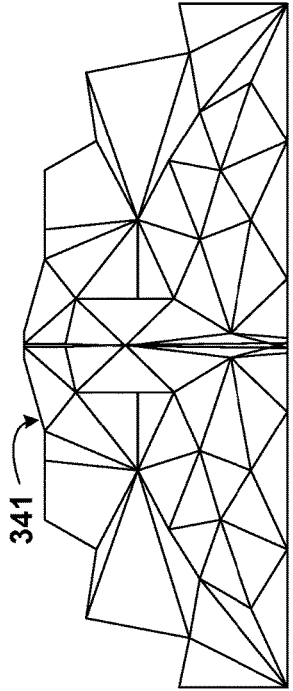
Figure 3A:
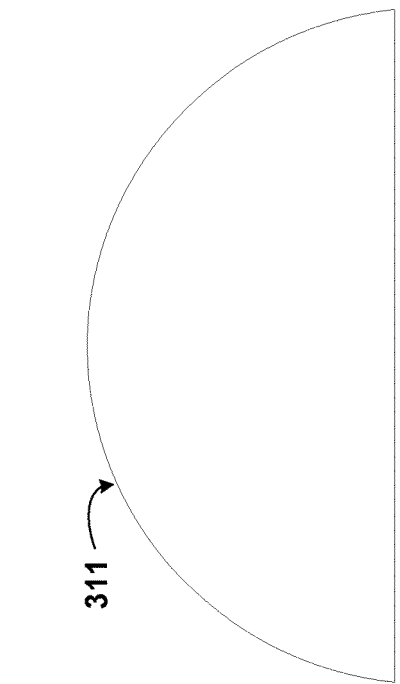

FIG. 3a is a side view illustration of a first possible shape 311 for the convex reflective elements 104. The first possible shape 311 is substantially hemispherical. The first possible shape 311 may be similar to the shape of the convex reflective elements 104 as illustrated in the embodiment of FIGS. 1 and 2. The first possible shape 311 illustrated in FIG. 3a may represent a substantially smooth, domed surface. The surface of the first possible shape 311 may allow for a continuous (as opposed to a discrete) distribution of azimuthal angles and elevation angles (within a defined range) at which light can be reflected from the convex reflective element 104.

FIG. 3b is an isometric illustration of a second possible shape 321 for the convex reflective elements 104. The second possible shape 321 is pyramidal. The dotted lines depict the back, bottom corners of the convex reflective element 104 that are hidden from view. The surface of the second possible shape 321 may provide a defined, discrete distribution of azimuthal angles (e.g., four different azimuthal angles at 0 degrees, 90 degrees, 180 degrees, and 270 degrees) with a single elevation angle (e.g., 45 degrees) at which light can be reflected from the convex reflective element 104.

Figure 3C:
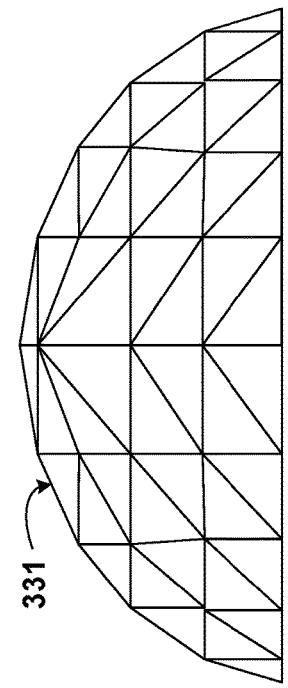

FIG. 3c is a side view illustration of a third possible shape 331 for the convex reflective elements 104. The third possible shape 331 is faceted in an orderly fashion. The surface of the third possible shape 331 may allow for a discrete, evenly spaced distribution of azimuthal angles (e.g., 0 to 360 degrees spaced in 3 degree increments) with a discrete, evenly spaced distribution of elevation angles (e.g., 5 degrees to 90 degrees spaced in 1 degree increments) at which light can be reflected from the convex reflective element 104.

FIG. 3d is a side view illustration of a fourth possible shape 341 for the convex reflective elements 104. The fourth possible shape 341 is faceted in an irregular fashion. The surface of the fourth possible shape 341 may allow for a discrete, unevenly spaced distribution of azimuthal angles (e.g., one-hundred different select angles from 0 to 360 degrees) with a discrete, unevenly spaced distribution of elevation angles (e.g., fifty different select angles from 1 to 90 degrees) at which light can be reflected from the convex reflective element 104.

Figure 4:
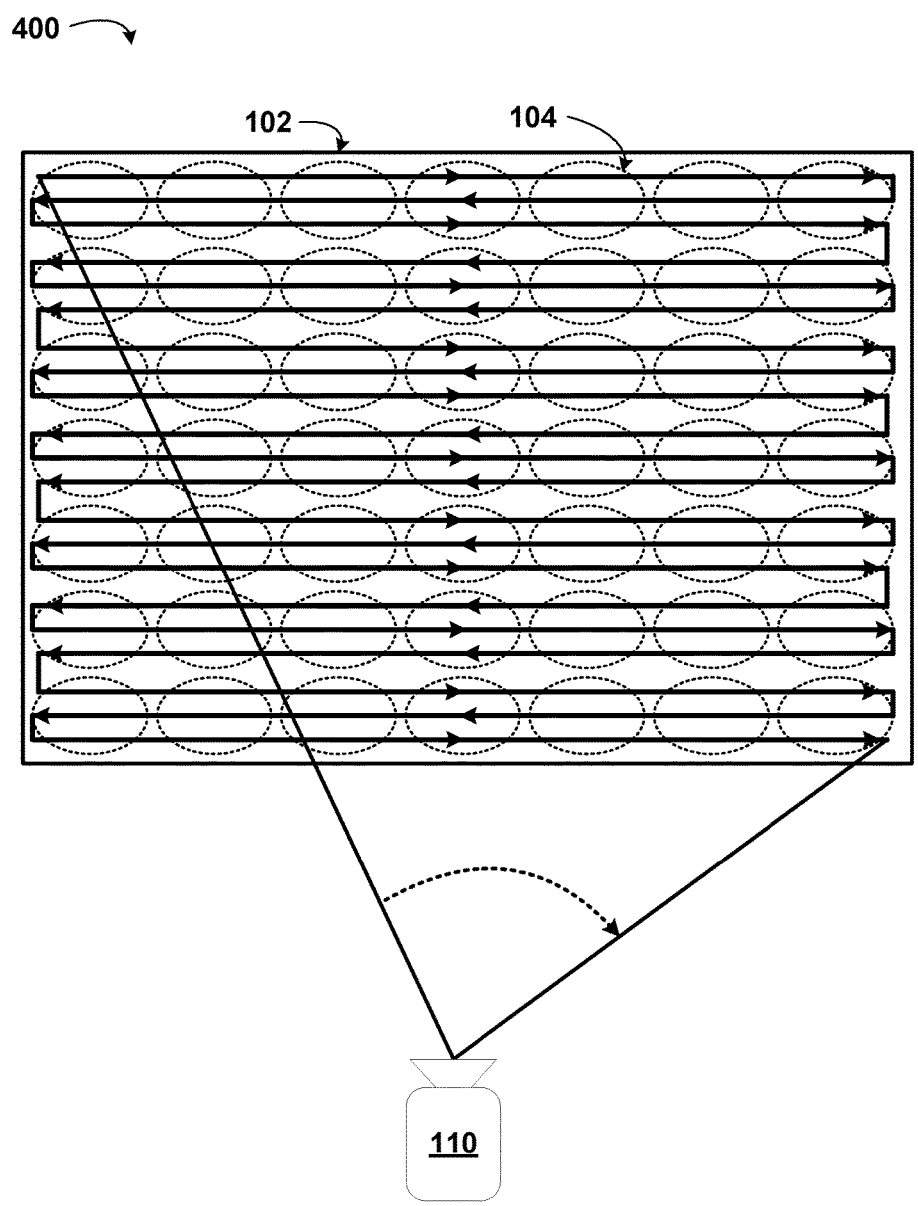
FIG. 4 is an illustration of a method of scanning convex reflective elements, according to example embodiments.

FIG. 4 is an illustration of a method 400 of sequentially scanning the convex reflective elements 104 on the screen 102 using the projection unit 110. The number of convex reflective elements 104 on the screen 102 illustrated in FIG. 4 is provided as an example, and may not reflect the preferred number of convex reflective elements 104 in an actual system. The convex reflective elements 104 on the screen 102 may be sequentially scanned, as illustrated in FIG. 4, by reflecting light emitted from the light source 112 within the projection unit 110 off of the horizontally rotating movable mirrored element 118 and off of the vertically rotating movable mirrored element 120 toward the screen 102. The sequential scanning method 400 of FIG. 4 may provide a light field that is concurrently viewable from a plurality of perspectives.

In the example embodiment illustrated in FIG. 4, the method 400 includes sweeping the light emitted from the light source 112 from left to right, horizontally, across the screen 102. Next, the method 400 includes moving down to a second vertical location on the screen 102 and sweeping that horizontal path using light emitted from the light source 112 from right to left. After, the method 400 includes moving down to a third vertical location on the screen 102. These steps may repeat until light has been reflected from the bottom-rightmost location on the screen 102 from which light is reflected to generate a light field. To achieve a scanning pattern as depicted in FIG. 4, the horizontally rotating movable mirrored element 118 may be rotating at a higher rate than the vertically rotating movable mirrored element 120, in some embodiments.

In various embodiments, the light from the light source 112 may be swept across the convex reflective elements 104 in a continuous manner or at discrete points, depending on the design of the horizontally rotating movable mirrored element 118 and the vertically rotating movable mirrored element 120. For example, if the horizontally rotating movable mirrored element 118 includes a mirror wrapped around a rotating cylinder, and the mirror has a continuously varying angle, the horizontal portion of the scan may be continuous from left to right and right to left, as illustrated in FIG. 4. Further, to generate the scanning pattern illustrated in FIG. 4, the vertically rotating movable mirrored element 120 may be faceted such that only specific vertical locations on the screen 102 are scanned. In alternate embodiments, the horizontal scanning lines may be segmented due to a discrete horizontal scan occurring, as opposed to a continuous scan. Further, in alternate embodiments, the vertical locations of the horizontal scans may be more densely or less densely packed than in FIG. 4. Furthermore, the horizontal density and/or vertical density with which the light ray projection locations on the screen 102 occur may serve to define an effective "resolution" of the generated light field.

Additionally, alternate scanning patterns are possible, in various embodiments. For example, each horizontal scan may occur from left to right, and be reset after every horizontal line back to the left end of the screen 102. Alternatively, each horizontal scan may occur from right to left, and be reset after every horizontal line back to the right end of the screen 102. As an additional alternative, a sequential scan of the screen 102 may occur from the bottom of the screen 102 upward rather than from the top of the screen downward. Still further, the scan could be wholly irregular, appearing to jump from one random location on a given convex reflective element 104 to another, based on the design of the one or more movable mirrored elements 118/120 (e.g., facets covered with mirrors on the movable mirrored elements 118/120 are not placed angularly sequentially around the perimeter of the movable mirrored elements 118/120, thus the light ray emitted from the projection unit 110 may appear to illuminate the screen 102 in an irregular pattern). In addition, rather than tracing out the scanned pattern from top to bottom, line by line (i.e., performing a progressive scan), the projection unit 110 could skip every other line and then come back and fill in the skipped lines (i.e., perform an interlaced scan, similar to the way in which cathode ray tubes, CRTs, perform interlaced scans).

Still further, the rate at which the method 400 scans the entirety of the screen 102 may vary based on a modulation scheme determined by a control system 116 within the projection unit 110. The rate may also depend on the rotational speed of one or more movable mirrored elements 118/120, for example. The rate at which the scan occurs determines the rate at which a generated light field is refreshed when viewed from a plurality of perspectives. Due to the phenomenon referred to as "the persistence of vision", the light field projection system 100 may be used to generate light fields that represent a moving scene to an observer. In such embodiments, the light field refresh rate may be at least 24 Hz to ensure a "persistence of vision" by observers of the light fields. In some embodiments, the scan refresh rate may be higher than 24 Hz. For example, in embodiments where an additional scan of the screen 102 occurs for each of three primary colors (red, green, and blue, for example) to generate multiple light fields of different colors, and thereby recreate a color scene for an observer, the refresh rate may be at least 72 Hz (24 Hz times 3 for each color).

Figure 5A:
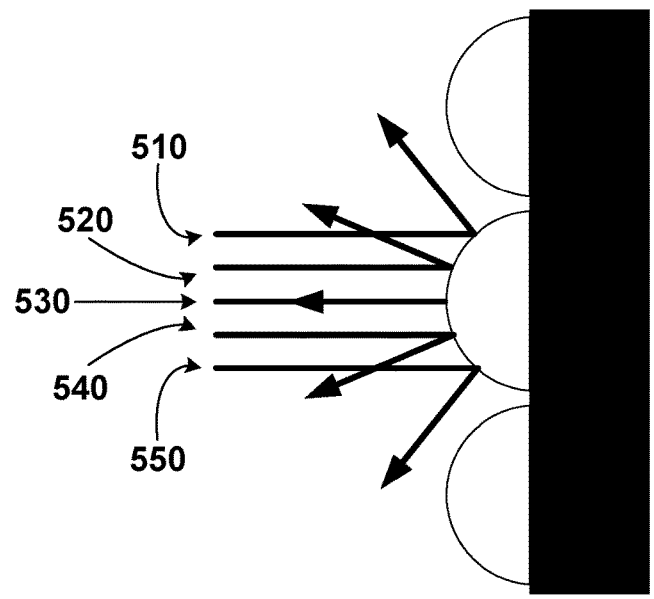
FIGS. 5a and 5b are illustrations of light rays occurring during a scanning of convex reflective elements (side view and top view, respectively), according to example embodiments.

FIG. 5a is a side view illustration of light rays 510, 520, 530, 540, 550 occurring during a horizontal scan of five different latitudinal positions on the convex reflective elements 104, similar to five of the horizontal scan lines occurring in FIG. 4. Different from FIG. 4, however, is the fact that there are five horizontal scans occurring across each convex reflective element 104, rather than three horizontal scans.

Each light ray 510, 520, 530, 540, 550 represents multiple light rays projected at various horizontal positions along the screen 102 (or longitudinal position along the individual convex reflective element 104) but at the same respective vertical position along the screen 102 (or latitudinal position along the individual convex reflective element 104).

Figure 5B:
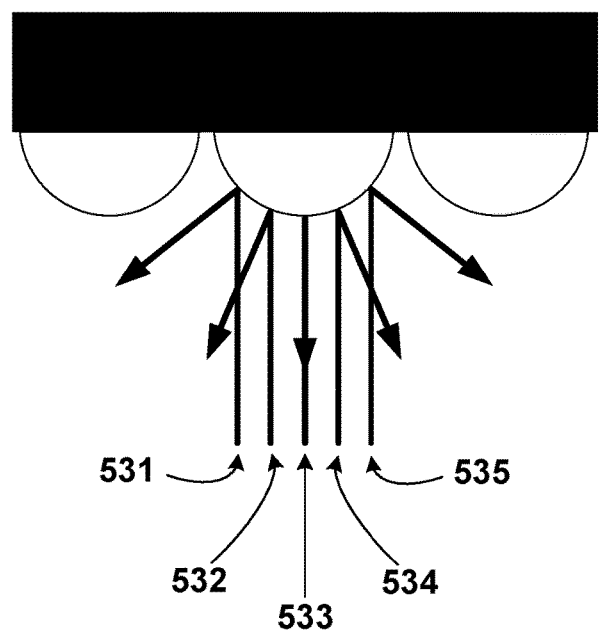

For example, as shown in FIG. 5b (a top view illustration), the light ray 530 represented in FIG. 5a is projected along the corresponding row of convex reflective elements 104 at longitudinal positions 531, 532, 533, 534, 535. The longitudinal positions 531, 532, 533, 534, 535 may be based on the angle of projection of light emitted from the projection unit 110. The five consecutive angles of projection used to emit light to the five longitudinal positions 531, 532, 533, 534, 535, for example, may be defined by five consecutive faceted reflectors at different angles along the perimeter of the horizontally rotating movable mirrored element 118. Because, in the embodiments illustrated in FIGS. 5a and 5b, the convex reflective elements 104 are substantially hemispherical, each pair of latitudinal position and longitudinal position on a single convex reflective element 104 produces a reflection at a different pair of azimuthal and elevation angles. The use of five latitudinal positions and five longitudinal positions is by way of example, and may not reflect the preferred number of positions in an actual system for an individual convex reflective element 104.

Figure 6:
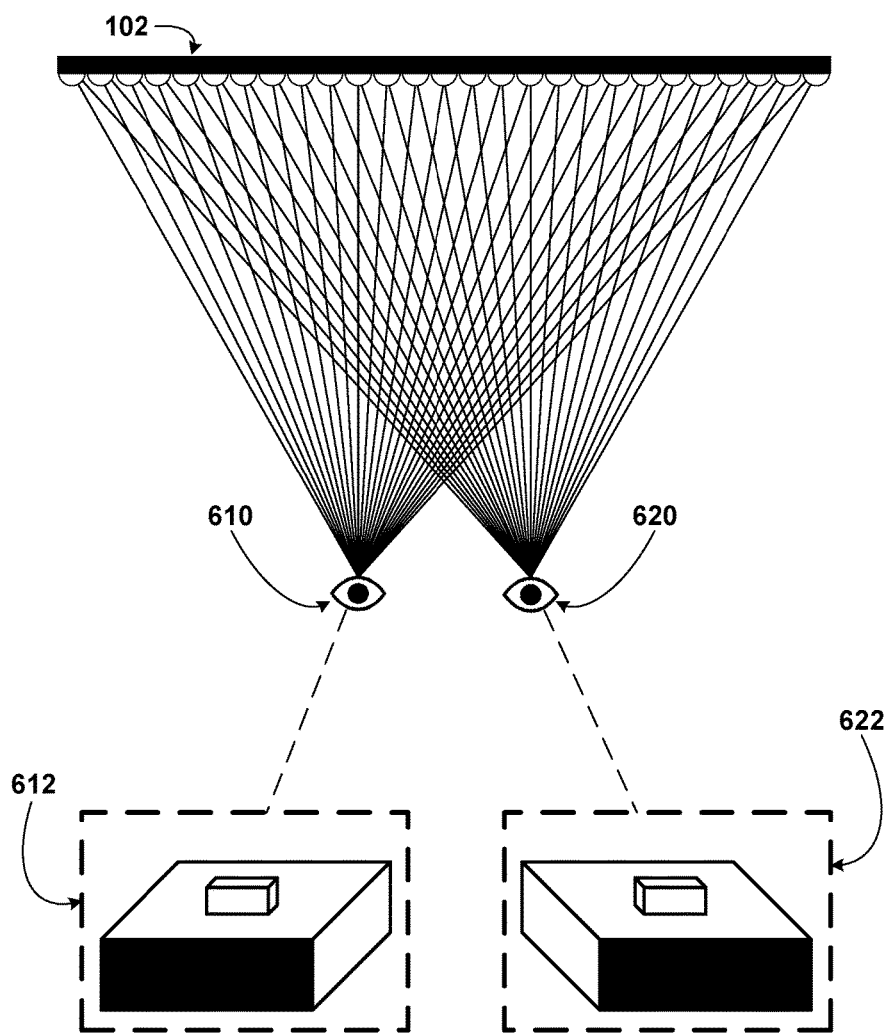
FIG. 6 is an illustration of two perspective views of a light field, according to example embodiments.

FIG. 6 is an illustration of two perspective views 612, 622 of a scene (e.g., one block on top of another) recreated by a light field. The orientation of the two observers 610, 620 viewing the reflections with respect to the screen 102 is displayed from above. The two observers 610, 620 are at different x-locations (i.e., horizontal locations) with respect to the screen coordinates. Each observer 610, 620 may receive one or more reflections from each of the convex reflective elements 104 on the screen 102. Because the screen 102 may include a 2D array of convex reflective elements 104, the number of convex reflective elements 104 providing reflections may be more than is shown in FIG. 6, as FIG. 6 is a top-view. The more densely packed and the smaller the convex reflective elements 104, the more the light field generated by the light field projection system may appear to represent a full, continuous light field to the observers 610, 620. The light field responsible for the two perspective views 612, 622 in FIG. 6 may be projected by a light field projection unit 110.

The perspective view from the left 612 illustrates how the observer 610 on the left may perceive the light field. Similarly, the perspective view from the right 622 illustrates how the observer 620 on the right may perceive the light field. If the two observers 610/620 were close enough to one another (e.g., if the two observers 610/620 were two eyes of a person), a binocular view of the scene may be created. Such a binocular view may create a stereoscopic 3D image for the union of the two observers 610/620.

The reason that the perspective view from the left 612 and the perspective view from the right 622 produce different views of the scene is because the two perspective views 612/622 are receiving different light rays from different angles reflected off of the screen 102. Each of the two observers 610/620 is located at a different set of quadruples (sets of x, y, $\phi$, and $\theta$) within the light field that is reflected from the screen 102. The light field may be projected by a projection unit 110, for example, such that each respective quadruple correctly recreates a perception of the scene from that quadruple. For example, a control system 116 within a projection unit 110 may determine a modulation scheme for a modulator 104 such that the light rays modulated according to the modulation scheme properly reconstruct the scene for each of the two observers 610/620.

If the location of one or both of the observers 610/620 changed, the respective observer may be located at a new set of quadruples (sets of x', y', $\phi$', and $\theta$') within the light field. Thus, the perception of the scene from the new quadruples may be different than the perception of the scene from the original quadruples. This is similar to the way the perspective view from the left 612 of the scene is different from the perspective view from the right 622 of the scene. Alternatively, the observers 610/620 could be located at different y-locations (i.e., vertical locations) with respect to the screen 102. An example of such an orientation of observers is illustrated and described with respect to FIG. 7.

Figure 7:
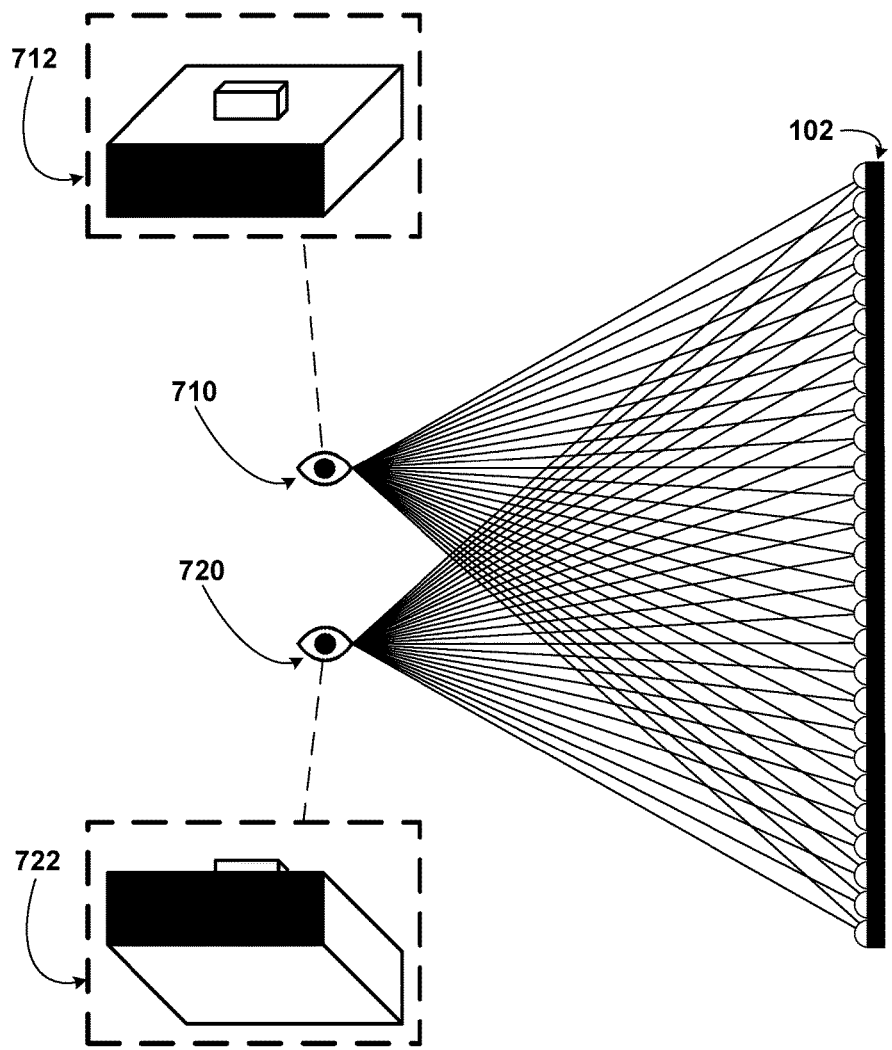
FIG. 7 is an illustration of two perspective views of a light field, according to example embodiments.

FIG. 7 is an illustration of two perspective views 712, 722 of a scene (e.g., one block on top of another) recreated by a light field. The orientation of the two observers 710, 720 viewing the reflections from the screen 102 is displayed from the right side. The two observers 710, 720 are at different y-locations with respect to the screen coordinates. Each observer 710, 720 may receive a reflection from each of the convex reflective elements 104 on the screen 102. The more densely packed and the smaller the convex reflective elements 104, the more the light field generated by the light field projection system may appear to represent a full, continuous light field to the observers 710, 720

The light field generating the two perspective views 712, 722 in FIG. 7 may be projected by a light field projection unit 110.

The perspective view from the top 712 illustrates how the observer 710 on the top may perceive the light field. Similarly, the perspective view from the bottom 722 illustrates how the observer 720 on the bottom may perceive the light field. If the two observers 610/620 were close enough to one another (e.g., if the two observers 710/720 were two eyes of a person), a binocular view of the scene may be created. Such a binocular view may create a stereoscopic 3D image for the union of the two observers 710/720.

The reason that the perspective view from the top 712 and the perspective view from the bottom 722 produce different views of the scene is because the two perspective views 712/722 are receiving different light rays from different angles reflected off of the screen 102. Each of the two observers 710/720 is located at a different set of quadruples (sets of x, y, $\phi$, and $\theta$) within the light field that is reflected from the screen 102. The light field may be projected by a projection unit 110, for example, such that each respective quadruple correctly recreates a perception of the scene from that quadruple. For example, a control system 116 within a projection unit 110 may determine a modulation scheme for a modulator 104 such that the light rays modulated according to the modulation scheme properly reconstruct the scene for each of the two observers 710/720.

If the location of one or both of the observers 710/720 changed, the respective observer may be located at a new set of quadruples (sets of x', y', $\phi$', and $\theta$') within the light field. Thus, the perception of the scene from the new quadruples may be different than the perception of the scene from the original quadruples. This is similar to the way the perspective view from the top 712 of the scene is different from the perspective view from the bottom 722 of the scene. Alternatively, the observers 710/720 could be located at different x-locations (i.e., horizontal locations) with respect to the screen 102. An example of such an orientation of observers is illustrated and described with respect to FIG. 6.

Furthermore, the observers 710/720 could be located at both different x-locations and different y-locations with respect to one another. In this case, the differences between the perspective views of the scenes shown in FIGS. 6 and 7 may be superposed.

In some embodiments, certain quadruples of the light field may be generating different scenes, entirely. For example, the light field may be projected by the projection unit 110 such that any quadruples with an azimuthal angle ($\phi$) of 0 to 180 degrees will reproduce a mountain scene when viewed by an observer, whereas any quadruples that have an azimuthal angle ($\phi$) of 180 to 360 degrees will reproduce an ocean scene. This would allow observers above a certain vertical location with respect to the screen 102 to perceive one scene (e.g., the mountain scene) and would allow observers below a certain vertical location with respect to the screen 102 to perceive a separate scene (e.g., the ocean scene). This could alternately be done base on the horizontal location of the observer by instead varying the azimuthal angle ($\phi$) range of the mountain scene from 0 to 90 degrees and 270 to 360 degrees and the azimuthal angle ($\phi$) range of the ocean scene from 90 to 270 degrees.

Figure 8:
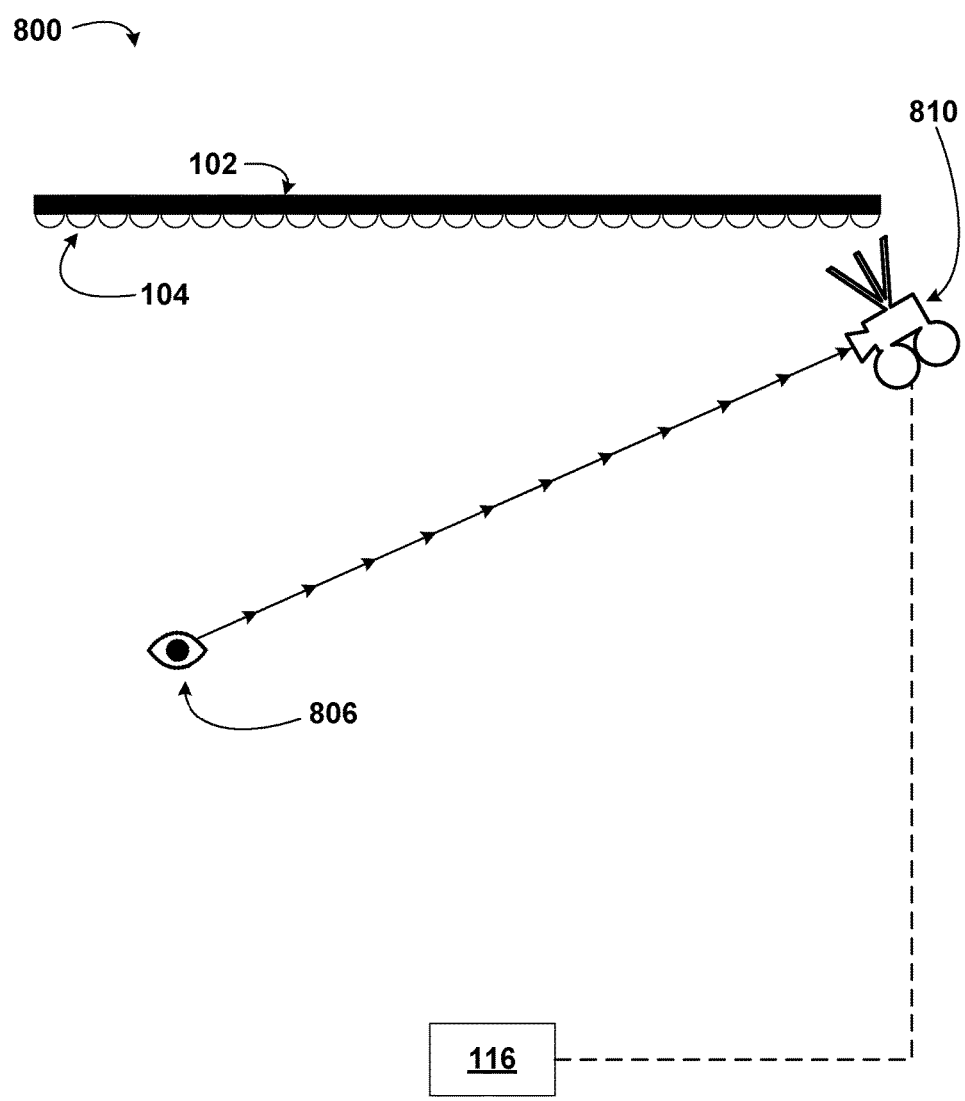
FIG. 8 is an illustration of a light field projection system, according to example embodiments.

FIG. 8 is an illustration of a light field projection system 800. The light field projection system 800 is similar to that illustrated in FIG. 1. Please consult FIG. 1 and accompanying description for more information regarding the screen 102, the convex reflective elements 104, and the projection unit 110 (including the control system 116). However, in the light field projection system 800 of FIG. 8, a location of an observer 806 may be tracked by a location tracking device 810. The dashed line in FIG. 8 represents a communicative coupling between the location tracking device 810 and the control system 116.

The location tracking device 810 may be an infrared sensor, a low-power laser system, or a camera, in various embodiments. The location tracking device 810 may identify, relative to the screen 102, the location of the observer 806. This may include the location tracking device 810 determining one or more quadruples of a generated light field that the observer 806 could perceive at its given location. Upon identifying the location of the observer 806, the location tracking device 810 may transmit a notification to the control system 116 indicating the location of the observer 806. This may be done by a wireline communication (e.g., over an Ethernet or universal serial bus—USB cable) or wireless communication (e.g., using Bluetooth® or WiFi—IEEE 802.11 standards), for example. In some embodiments, the location tracking device 810 may be a part of the screen 102. In alternate embodiments, the location tracking device 810 may be part of the projection unit 110. In still further embodiments, the location tracking device 810 may operate independently and transmit the results to the control system 116, as illustrated in FIG. 8.

Upon receiving the location of the observer 806, the control system 116 may modify a modulation scheme for use by the modulator 114 to generate the light field. For example, if the observer 806 constitutes all of the potential quadruples of the light field at which the light field will be viewed (e.g., the observer 806 is the only one perceiving the light field), the modulator 114 need not modulate light to generate other regions of the light field. This may reduce the calculation time (i.e., rendering time) for the control system 116 to determine a modulation scheme to reproduce the scene as a light field for different perspectives, because many possible perspectives need not be rendered. Furthermore, certain portions of the screen 102 and certain portions of each convex reflective element 104 may not need to be illuminated. This could conserve energy usage by the projection unit 110.

In some embodiments, the location tracking device 810 may be configured to track the locations multiple observers. The location tracking device 810 may then transmit multiple locations to the control system 116, thereby permitting the control system to determine a modulation scheme that would produce a light field viewable from a plurality, but not all possible, perspectives. Further, the location tracking device 810 may track two observer locations where each observer location corresponds to a person's left or right eye. Upon transmitting these two locations to the control system 116, the control system 116 could determine a modulation scheme that would project a light field viewable from the perspective (i.e., collection of one or more quadruples with respect to the light field) of both eyes. This may permit the projection unit 110 to project a light field that appears stereoscopically 3D to a viewer while only modulating the light field so that it is viewable in two, rather than all possible, viewing locations.

Similarly, the location of multiple separate observers could be tracked by the location tracking device 810 to permit a scene change within the light field. For example, the location tracking device 810 may transmit the location of two users to the control system 110. The control system 110 may then determine a modulation scheme to generate a light field that creates a different scene for each observer (e.g., one observer perceives a mountain scene and one perceives an ocean scene). As an additional application, if the projection system 100 were used to play a game, one observer could be shown her poker hand while the second observer was shown his poker hand, without each being able to see the other's poker hand. Furthermore, this may allow the control system 116 to determine a modulation scheme that produces a light field with a variation in intensity or produces multiple light fields that vary in color at different observing locations. Such variations could accommodate viewers who are partially blind and/or are color blind while not altering the viewing experience of viewers who do not have such visual impairments.

Figure 9:
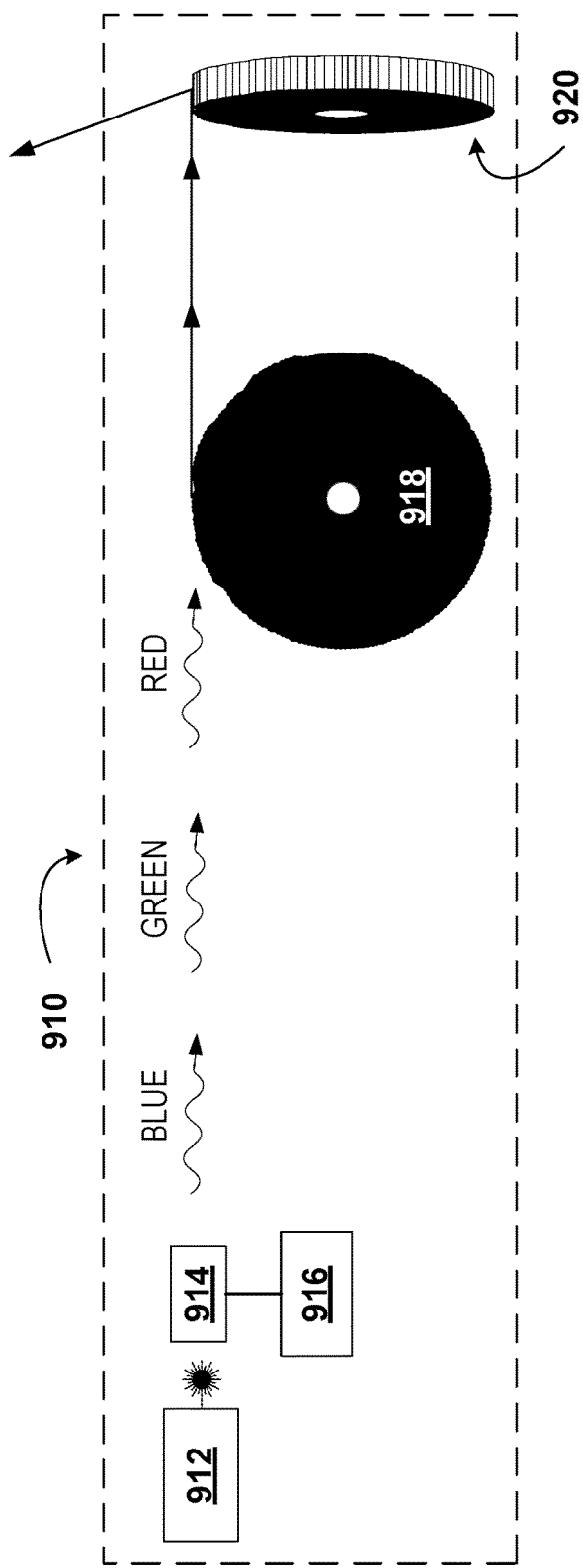
FIG. 9 is an illustration of a method of generating light fields of different colors, according to example embodiments.

FIG. 9 is an illustration of a method of generating light fields of different colors with a projection unit 910. The projection unit 910 is analogous to the projection unit 110 illustrated in FIG. 1, please consult FIG. 1 and the accompanying description for more detail regarding the projection unit 910. Similar to the projection unit 110 illustrated in FIG. 1, the projection unit 910 has a light source 912, a modulator 914, a control system 916, and two movable mirrored elements 918/920. Unlike the projection unit 110 illustrated in FIG. 1, though, the projection unit 910 illustrated in FIG. 9 is configured to produce light fields of different frequencies.

One method of producing light fields of different colors may include multiplexing the light fields in time, as illustrated in FIG. 9. More specifically, a red light ray may be emitted toward the horizontally rotating movable mirrored element 918, and then reflect off the horizontally rotating movable mirrored element 918 and the vertically rotating movable mirrored element 920. This red light ray is then reflected off the screen 102 at a later time. Before one or both of the mirrored elements 918/920 rotate to display their next facet, however, a green light ray may follow the same path the red light ray followed and reflect off the same location on the screen 102. Similarly for a blue light ray. These three colors (red, green, and blue—RGB, or, in alternate embodiments, cyan, magenta, and yellow—CMY) may then be perceived by an observer as overlapping, given that they are reflected off of the screen 102 at the same quadruple and at roughly the same time. Hence, the three quadruples of disparate light fields may appear to the observer as a single quadruple of one "colored light field". Given the weighted light intensity of each of the red, green, and blue rays, multiple other colors can be generated that are perceivable by an observer.

The method for multiplexing the three, or more, colored light rays in time may include three consecutive light rays of different colors being generated by the light source 912. Alternatively, the light source 912 may generate white light and then have a selective filter for the three, or more, different colors that is modulated at a 33% duty cycle for each color (using the three color example of FIG. 9) and offset in time, one from the next, by 33%. In other embodiments, the modulator 914 may instead have a frequency filter. Further, the modulator 914 may have other means of modulating the frequency of the light emitted by the light source 912. Additionally, a modulation scheme encoded by the control system 916 may include frequency modulation of the light emitted by the light source 912 in addition to intensity modulation. The frequency selected by such a modulation scheme may be capable of selecting the requisite frequency for the light field within a range of frequencies, rather than selecting one of three colors (e.g., RGB) and attempting to use combinations of those three colors to create alternate colors.

An alternative means of multiplexing multiple light fields of differing frequencies (colors) may involve a different design of the movable mirrored elements 918/920. Rather than the movable mirrored elements 918/920 solely determining the location on the screen 102 at which the light emitted from the light source 912 is directed, the movable mirrored elements 918/920 may also select the frequency of the light they reflect. For example, three consecutive facets on the horizontally rotating movable mirrored element 918 may be angled with respect to the screen 102 at the same angle. However, each of the three consecutive facets may be coated with a different material, each materially selectively reflecting light of a different color (RGB, in an example embodiment analogous to the embodiment illustrated in FIG. 9).

Figure 10:
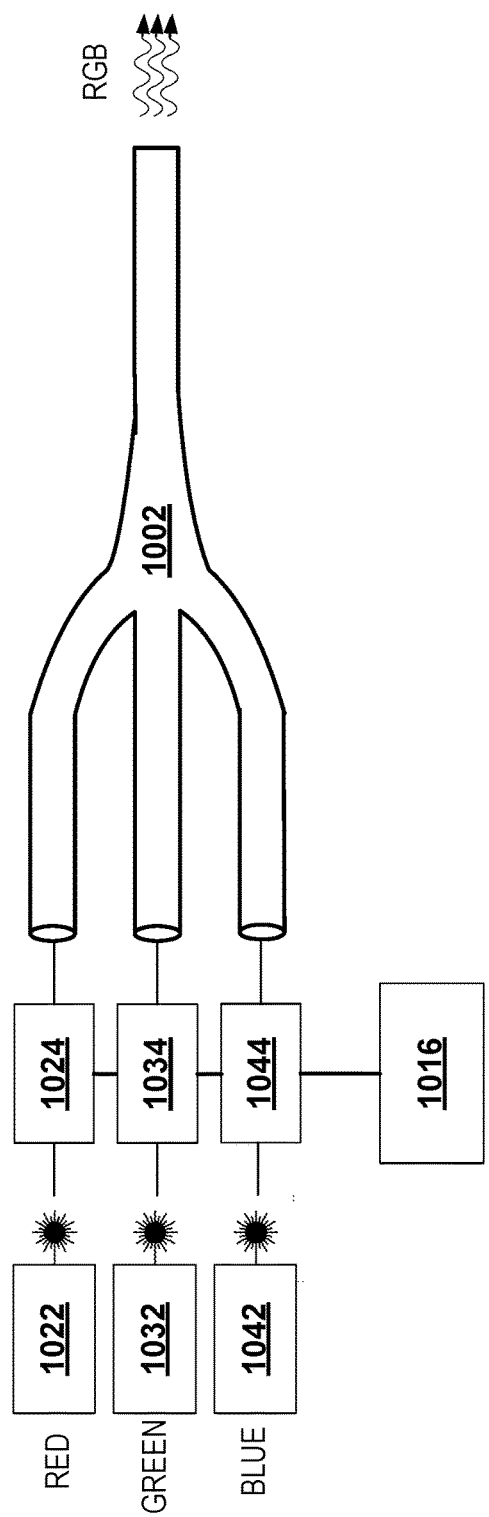
FIG. 10 is an illustration of a method of generating light fields of different colors, according to example embodiments.

FIG. 10 is an illustration of another method of generating light fields of different colors. The components illustrated in FIG. 10 may be part of a larger projection unit. The components include a light combining fiber 1002, a first light source 1022 and a corresponding first modulator 1024, a second light source 1032 and a corresponding second modulator 1034, a third light source 1042 and a corresponding third modulator 1044, and a control system 1016. Similar to the projection units 110, 910 illustrated in FIGS. 1 and 9, respectively, the light output at the end of the light combining fiber 1002 could next be directed to a horizontally rotating movable mirrored element.

The light combining fiber 1002 may be formed of multiple input fibers (e.g., one for each light source 1022, 1032, 1042) spliced together at a fusion splice with a single output fiber. The lengths of the multiple input fibers may be the same, such that the optical path length for light emitted from each of the light sources 1022, 1032, 1042 is the same. In some embodiments, the light combining fiber 1002 may be made of silicon dioxide, for example. In alternate embodiments, free space optics, such as one or more mirrors or one or more lenses, may be used in addition to or in place of the light combining fiber 1002.

The light sources 1022, 1032, 1042 may emit light of differing wavelengths. In the example embodiment illustrated in FIG. 10, the first light source 1022 emits light of a wavelength corresponding to the color red in the visible spectrum. Similarly, the second light source 1032 emits light of a wavelength corresponding to the color green in the visible spectrum and the third light source 1042 emits light of a wavelength corresponding to the color blue in the visible spectrum. The light sources 1022, 1032, 1042 may be lasers, in various embodiments. In some embodiments, there may be more than three light sources 1022, 1032, 1042. For example, there may be six light sources, in some embodiments; one that emits red light, one that emits orange light, one that emits yellow light, one that emits green light, one that emits blue light, and one that emits violet light.

In the example embodiment illustrated in FIG. 10, each of the light sources 1022, 1032, 1042 is modulated by a corresponding modulator 1024, 1034, 1044. Each of the modulators 1024, 1034, 1044 may modulate light according to a modulation scheme determined by the control system 1016. The light may be modulated by each modulator 1024, 1034, 1044 such that a light field is projected off a screen (e.g., the screen 102 illustrated in FIG. 1) corresponding to each of the three colors. These three light fields may be superimposed when perceived by an observer to form one scene with a continuum of colors based on the intensity of each of the base colors (e.g., red, green, and blue). In alternate embodiments, each of the modulators 1024, 1034, 1044 may be independently controlled by a respective control system, rather than jointly by a single control system 1016, as illustrated in FIG. 10.

Figure 11:
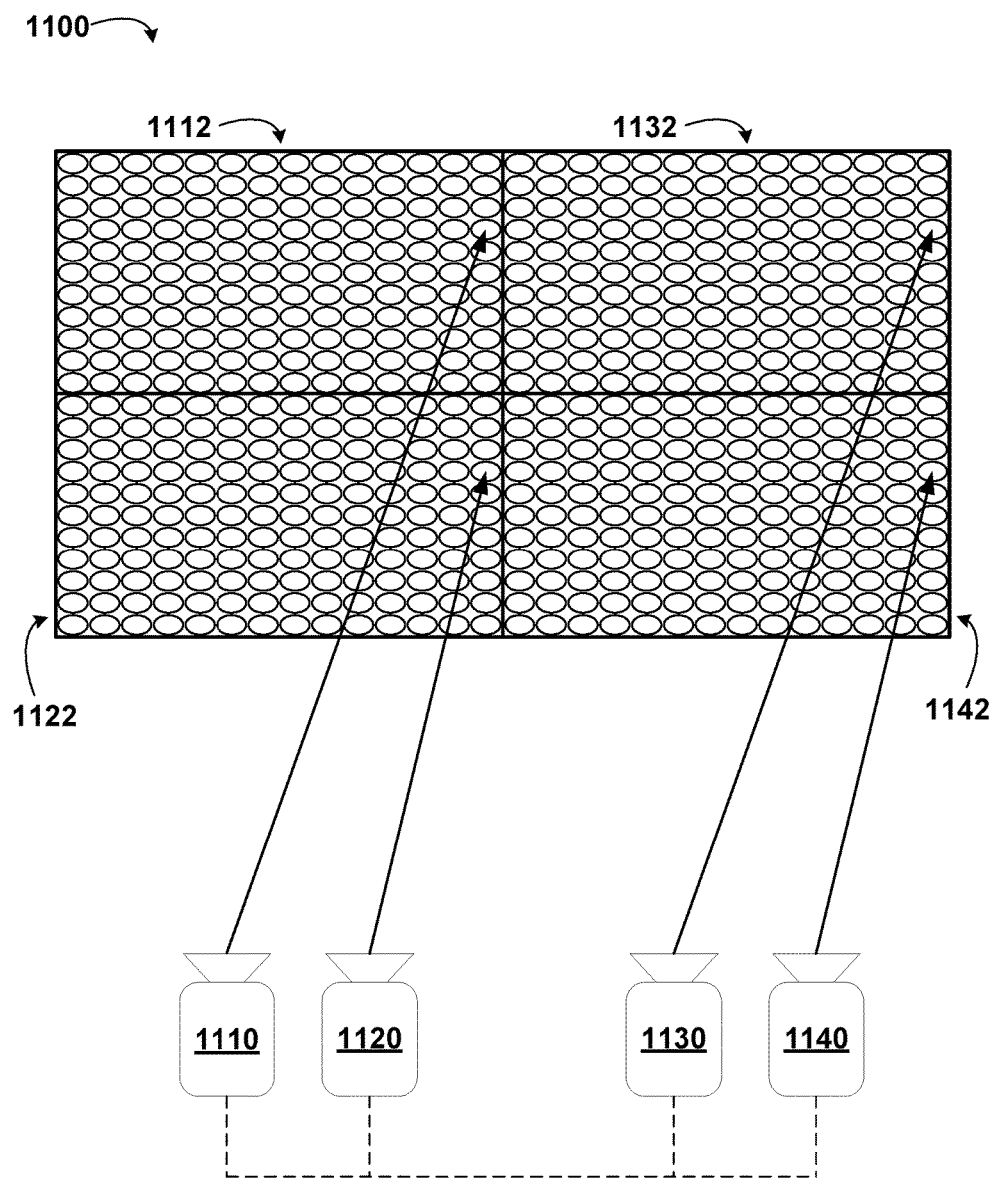
FIG. 11 is an illustration of a light field projection system, according to example embodiments.

FIG. 11 is an illustration of a light field projection system 1100. The light field projection system 1100 may comprise multiple subsystems that are similar to the light field projection system 110 illustrated in FIG. 1 tiled together such that the corresponding screens are adjacent. The light field projection system 1100 includes a first screen 1112 and a corresponding first projection unit 1110, a second screen 1122 and a corresponding second projection unit 1120, a third screen 1132 and a corresponding third projection unit 1130, and a fourth screen 1142 and a corresponding fourth projection unit 1140. The embodiment illustrated in FIG. 11 may permit borderless tiling of multiple screens to widen an area of permitted perspectives for viewing. In some embodiments, the projection units 1110, 1120, 1130, 1140 may sequentially scan the respective screens 1112, 1122, 1132, 1142 in different fashions (e.g., the projection unit 1110 may scan the corresponding screen 1112 from left-to-right, top-to-bottom and the projection unit 1120 may scan the corresponding screen 1122 from right-to-left, bottom-to-top).

The individual screens 1112, 1122, 1132, 1142 and the individual projection units 1110, 1120, 1130, 1140 may be analogous to the screen 102 and the projection unit 110 illustrated in FIG. 1, for example. However, in some embodiments of the light field projection system 1100 of FIG. 11, the screens 1112, 1122, 1132, 1142 and the projection units 1110, 1120, 1130, 1140 may work in tandem to produce a single light field (i.e., the range of x-coordinates and y-coordinates possible is increased given the increased size of the super-screen formed by the four individual screens 1112, 1122, 1132, 1142 disposed adjacent to one another). Such a single light field may reproduce one or more scenes concurrently viewable from various observer perspectives (analogous to the embodiment illustrated in FIG. 1). In order to accomplish this, control systems of the projection units 1110, 1120, 1130, 1140 may communicate with one another to determine a modulation scheme for each of the modulators within the respective projection units 1110, 1120, 1130, 1140. Additionally, because each of the projection units 1110, 1120, 1130, 1140 may only be rendering one-quarter of a given scene, the computational burden placed on each of the control systems within the respective projection units 1110, 1120, 1130, 1140 may be reduced compared to an embodiment in which each respective projection unit 1110, 1120, 1130, 1140 reproduced the entire given scene. Furthermore, in some embodiments, there may be an additional control system that is configured to divvy up a scene into smaller sub-scenes that are projected by each projection unit 1110, 1120, 1130, 1140. In alternate embodiments, there may be a single control system that determines the modulation scheme for use by the modulator within each of the projection units 1110, 1120, 1130, 1140, thereby replacing the respective control system within each respective projection unit 1110, 1120, 1130, 1140.

Figure 12:
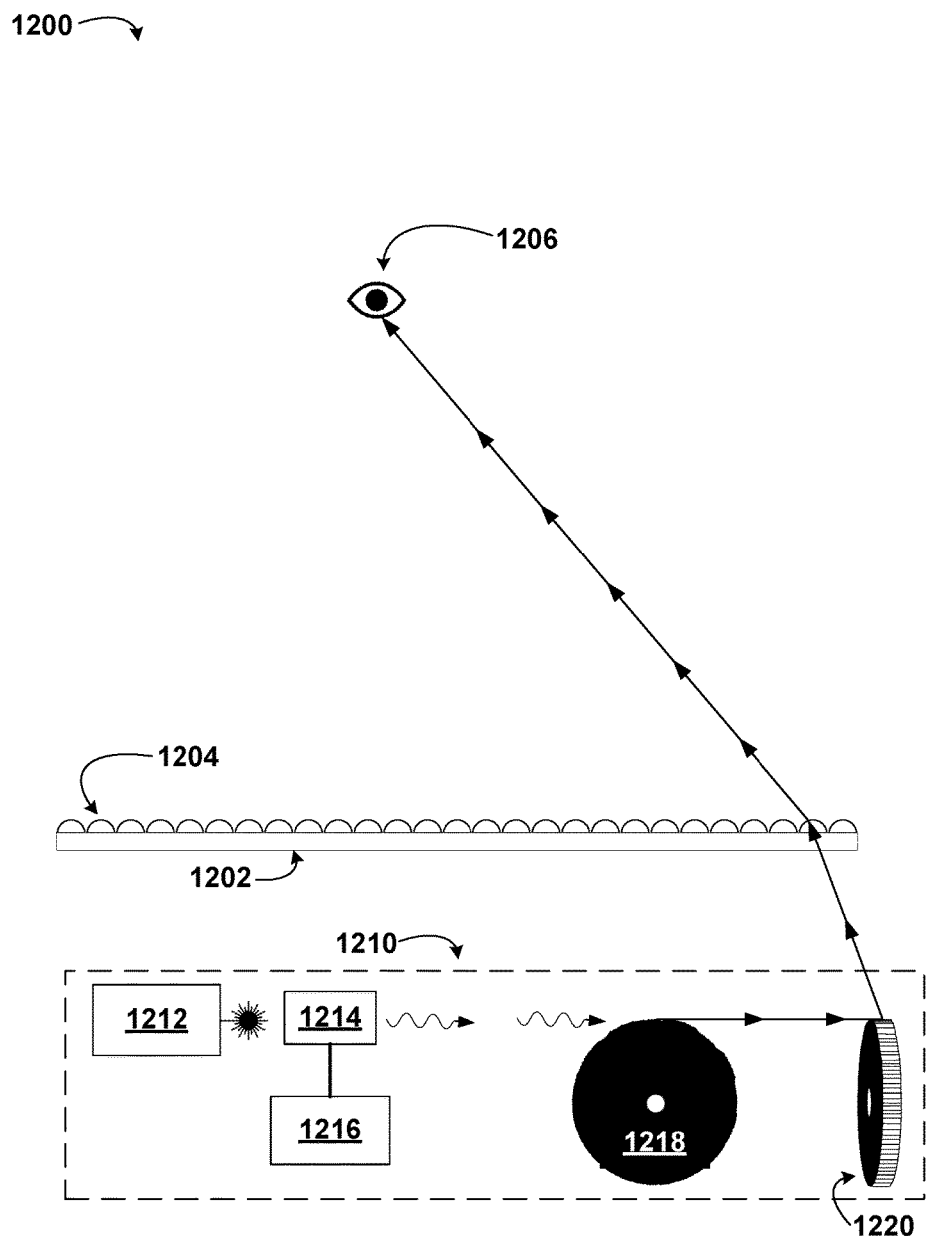
FIG. 12 is an illustration of a light field projection system, according to example embodiments.

FIG. 12 is an illustration of a light field projection system 1200. The light field projection system 1200 includes a screen 1202, with a plurality of concave refractive elements 1204 arranged into a two-dimensional array thereon, an observer 1206, and a projection unit 1210. The projection unit 1210 includes a light source 1212, a modulator 1214, a control system 1216, and movable mirrored elements 1218/1220. The light field projection system 1200 has a projection unit 1210 analogous to the projection unit 110 illustrated in FIG. 1. Please consult FIG. 1 and the accompanying description for more details regarding the light source 1212, the modulator 1214, the control system 1216, or the movable mirrored elements 1218/1220. The primary difference of the embodiment of the light field projection system 1200 illustrated in FIG. 12, however, is that the screen 1202, has concave refractive elements 1204 thereon, and lies between the projection unit 1210 and the observer 1206. The light field projection system 1200 illustrated in FIG. 12 may be spatially more compact, than the embodiment 100 illustrated in FIG. 1.

The concave refractive elements 1204 refract light projected by the projection unit 1210 to produce a light field. Analogous to the convex reflective elements 104, the concave refractive elements 1204 may be sequentially scanned by the projection unit 1210 and disperse light to project a light field (e.g., a light field that represents a scene when viewed from the respective perspective of the observer 1206, for example). The concave refractive elements 1204 may be, for example, substantially hemispherical lenses. The concave refractive elements 1204 may be fabricated of fused quartz, fluorite, or acrylic, in example embodiments.

III. Example Light Field Projection Methods

Figure 13:
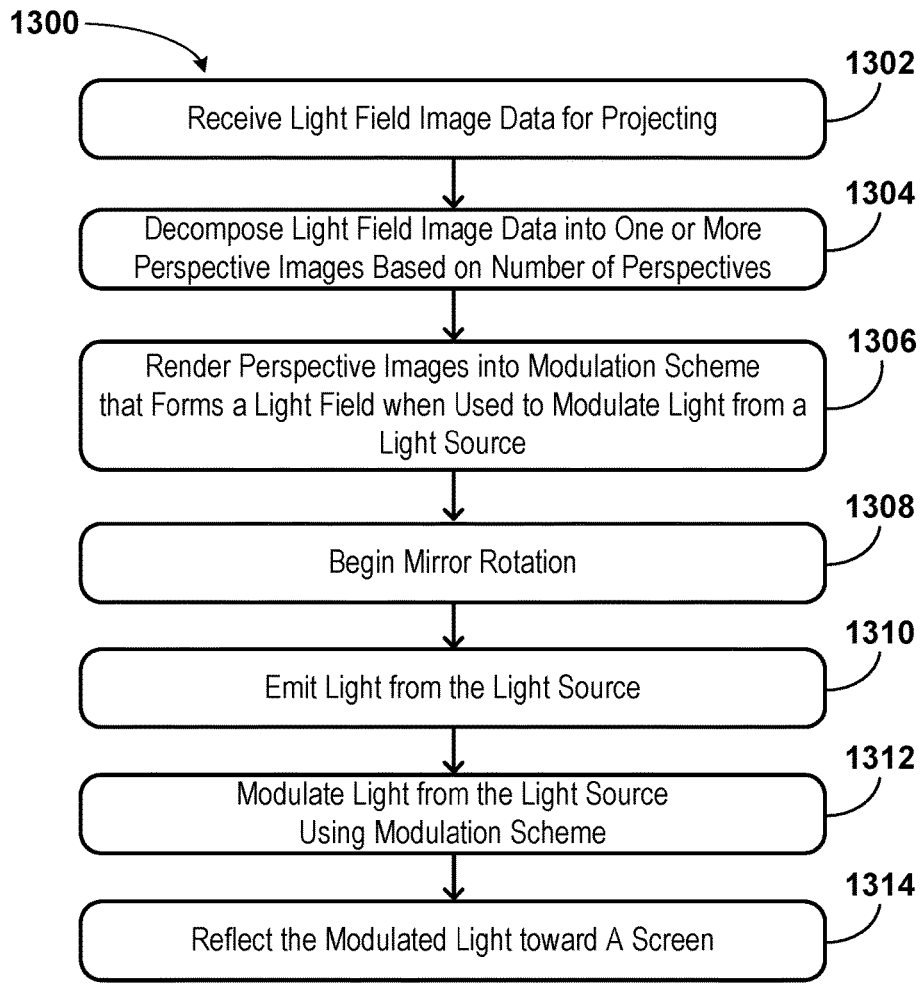
FIG. 13 is a flow chart illustration of a method, according to example embodiments.

FIG. 13 is a flow chart illustration of a method of generating a light field 1300, according to example embodiments. The method of generating the light field 1300 may be used to recreate one or more scenes that are viewable from a plurality of perspectives. Furthermore, the method of generating the light field 1300 may be performed by a projection unit of a light field projection system.

At step 1302, the method 1300 includes receiving light field image data for projecting. The light field image data may be retrieved by a processor in a control system 116 from a non-transitory computer-readable medium within the control system 116, for example. Alternatively, the light field image data may be transmitted to the control system 116 of the projection unit 110 by another device (e.g., over the public Internet). In some embodiments, the light field image data will be a single light field frame of a larger light field video data stream.

At step 1304, the method 1300 includes decomposing the light field image data into one or more perspective images based on a number of perspectives. The number of perspectives may be defined by the location of observers (e.g., as tracked by a location tracking device 810 illustrated in FIG. 8). Alternatively, the perspectives may be predefined locations (i.e., sets of quadruples) from which the light field is viewable. The control system 116 may use the perspectives to determine the modulation scheme. Therefore, a reduced number of perspectives may reduce the computation time required by the processor in the control system 116 to determine the modulation scheme.

At step 1306, the method 1300 includes rendering perspective images into the modulation scheme that forms a light field when used to modulate light from a light source. Based on the number of perspectives, certain portions of the light field may be neglected to be projected, as those portions of the light field may not be displayed (e.g., there may be no observer located at the location where the perspective corresponding to that portion of the light field is viewable, therefore it is not displayed). Because they may be neglected to be projected, the modulation scheme may include skipping over those perspectives (i.e., those perspectives are not rendered into the modulation scheme). Rendering perspective images into the modulation scheme that forms the light field may include calculating intensity values at each location (i.e., each light field quadruple) of the perspective image. Furthermore, calculating intensity values may include calculating intensity values for multiple wavelengths corresponding to multiple light fields when a color perspective light field image is to be displayed.

At step 1308, the method 1300 includes beginning rotation of the movable mirrored elements (e.g., the horizontally rotating movable mirrored element 118 and the vertically rotating movable mirrored element 120 illustrated in FIG. 1). This may involve engaging a motor or a set of electromagnets to begin the motion of the movable mirrored elements 118/120. In alternate embodiments in which alternate means of reflecting light from the light source 112 toward the screen 102 are used, step 1308 may by altered or neglected.

At step 1310, the method 1300 includes emitting light from the light source 112. Step 1310 may include the light source 112 being powered on and/or set to emission mode. Furthermore, step 1310, in some embodiments, may be performed by a control system within or connected to the light source 112. Additionally, step 1310 may include emitting light from multiple light sources. For example, if a light field projection unit being used to carry out method 1300 is analogous to the light field projection unit illustrated in FIG. 10, there may be multiple light sources 1022, 1032, 1042 for multiple wavelengths of light (i.e. colors in the visible spectrum).

At step 1312, the method 1300 includes modulating light from the light source using the modulation scheme. The modulation scheme may be stored within a memory of a modulator 114. Alternatively, the modulation scheme may be used by the control system 116 to repeatedly alter the conformation of the modulator 114 to modulate the light. Modulating the light may include electro-optic modulation methods of altering the intensity of the light received from the light source 112. Additionally or alternatively, modulating the light may include altering the wavelength of the light from the light source.

At step 1314, the method 1300 includes reflecting the modulated light toward a screen using the rotating movable mirrored elements 118/120 (or alternate elements, in various embodiments). In many embodiments, the modulation scheme created by the control system 116 has accounted for the timing of the rotation of the movable mirrored elements 118/120 such that the light is modulated in intensity for the specific, corresponding spot on the movable mirrored elements 118/120, and thus, ultimately, the corresponding location on the screen 102, to which that light will be directed. Also, in many embodiments, steps 1310, 1312, and 1314 may occur repeatedly and/or concurrently when carrying out the method 1300.

In some embodiments, one or more of the steps of method 1300 may be repeated multiple times for different scenes. For example, a sequence of light fields representing a moving scene (e.g., a live baseball game) may be projected by the projection unit. If the steps of method 1300 are repeated with sufficient rapidity (e.g., more than 24 times a second), motion in the moving scene may appear continuous to an observer due to the "persistence of vision" phenomenon. As an example calculation, if there are 1000 perspectives (e.g., 10 vertical locations of perspectives, each with 100 corresponding horizontal perspective locations), and the two-dimensional resolution of the scene at each of those perspectives is equivalent to 1080p technology (i.e., a resolution of 1920 quadruples by 1080 quadruples), with a refresh rate of 24 Hz, the projection unit 110 may need to output light rays at a rate of about 50 GHz (1000×1920× 1080×24 Hz). If distributed among four projection units 1110, 1120, 1130, 1140 (as illustrated in FIG. 11), for example, this rate could be reduced by a factor of four for each respective projection unit 1110, 1120, 1130, 1140.

Additionally, the light fields generated by repeating one or more of the steps of method 1300 may be concurrently viewable from a plurality of perspectives. This may permit a binocular viewer to stereoscopically observe the progressing light fields, thereby being provided with a continuous-motion, 3D image of the moving scene.

IV. Example Calibration Methods, Devices, and Systems

The calibration methods presented with regard to the following figures (FIGS. 14a-18) may be capable of accounting for any errors in the fabrication of a screen of a light field projection system (e.g., the screen 102 illustrated in the previous figures), damage caused to the screen, misalignment of the screen relative to a given viewer, and/or misalignment of the screen relative to a projection unit (e.g., the projection unit 110 illustrated in the previous figures). A screen having convex reflective elements thereon that can be used to project light fields can be calibrated using the following methods, for example. Additionally, screens having concave refractive elements thereon that can be used to project light fields could also be calibrated using analogous methods to those described herein.

The calibration methods presented herein can be used to account for surface, macro-orientation alignment errors of the entire screen or errors in distribution of the convex reflective elements (or concave refractive elements) within an array on the screen (e.g., if the sizes of the non-reflective interstitial regions between adjacent convex reflective elements is not consistent across the array). For example, if the convex reflective elements (or concave refractive elements) are spaced unevenly, rather than in consistent horizontal and vertical increments across the screen, time delays could be added or removed from a modulation scheme used to project a light field that generates a plurality of concurrently viewable perspectives to account for the inconsistency in spacing.

In the following example methods, one or more perspectives relative to the screen may be calibrated. The following methods could be used to calibrate a single perspective (e.g., a specific intended viewing perspective designated by a user). The following methods could also be used to calibrate two perspectives (e.g., two perspectives corresponding to the perspective locations of two eyes of a viewer whose location is being tracked by the projection system). Further, the following methods could be repeated for any number of perspectives relative to the screen, up to and including the maximum number of viewable perspectives relative to the screen. In other words, the calibration methods that follow can be used to calibrate one section of the surface of one of the convex reflective elements, multiple sections of the surface of one of the convex reflective elements, multiple sections of the surfaces of multiple convex reflective elements, multiple sections of the surfaces of all of the convex reflective elements, the entire surface of one of the convex reflective elements, the entire surface of multiple convex reflective elements, or the entire surface of all of the convex reflective elements (similarly for concave refractive elements).

In addition, the calibration methods that follow can be executed at various points in the lifetime of the screen/light field projection system. For example, any of the following methods could be performed while the screen and/or light field projection system are being fabricated, or immediately after the screen and/or light field projection system are fabricated, to ensure that the fabrication process produced a reliable screen/light field projection system. The calibration methods could also be performed upon installation of the light field projection system (e.g., in a user's home), upon powering on the light field projection system (e.g., an initialization occurs each time the light field projection system is powered on), or while the light field projection system is in use (e.g., the light field projection system performs calibration using infrared light so as not to interfere with the viewing experience of viewers of the light field projection system). The following calibration methods could also be performed at various other times in the lifetime of the screen/light field projection system.

Figure 14A:
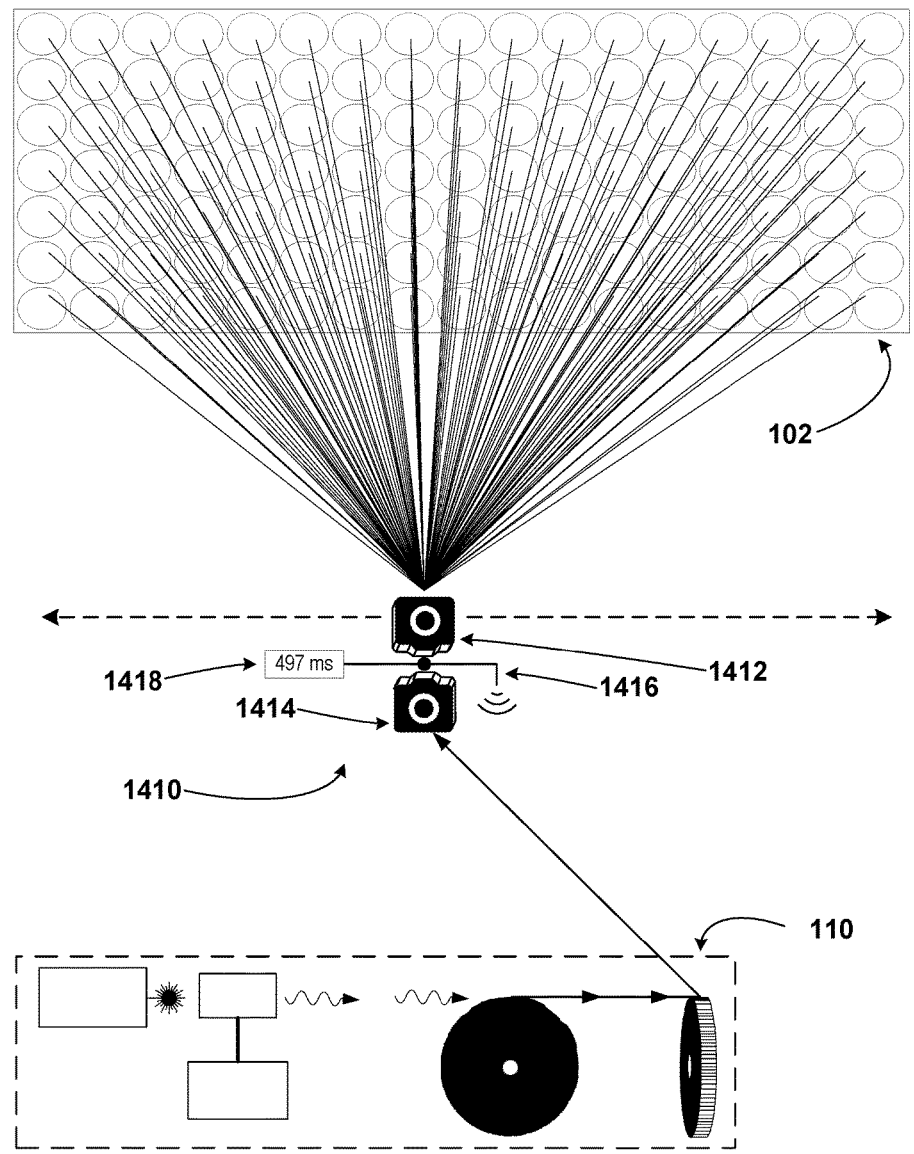
FIG. 14a is an illustration of a calibration method, according to example embodiments.

FIG. 14a is an illustration of a calibration method, according to an example embodiment. FIG. 14a depicts a light field projection unit 110 of a light field projection system sequentially scanning a screen 102. The light used to scan the screen 102 may be infrared (e.g., having an electromagnetic wavelength between 750 and 2,500 nm), for example, so as not to be visible by a viewer of the light field projection system. FIG. 14a also includes a calibration device 1410. The calibration device 1410 may include a second light detector 1412, a first light detector 1414, a transmitter 1416, and a time piece 1418.

The calibration method illustrated in FIG. 14a may proceed in the following manner. A modulator of the projection unit 110 of the light field projection system may modulate light transmitted by a light source of the light field projection system according to a baseline intensity profile. The baseline intensity profile may correspond to a specific light field used for calibration (e.g., a light field that corresponds to a Quick Response code—QR Code®), in some embodiments. For example, the baseline intensity profile may be defined such that the light intensity at each point in time is unique, thereby allowing a measurement of intensity to inherently correlate with a corresponding time. In other embodiments, the baseline intensity profile may be periodic. After the light is modulated according to the baseline intensity profile, the light may be transmitted toward and reflected off of one or more movable mirrored elements (e.g., a horizontally rotating movable mirrored element and/or a vertically rotating movable mirrored element). The one or more movable mirrored elements may sequentially direct the modulated light to different regions of the screen 102 so as to sequentially scan the plurality of convex reflective elements (i.e., project a scanning sequence toward the screen 102). The modulated light may then be reflected from the convex reflective elements toward different regions of an environment around the screen 102 to produce a light field or a portion of a light field.

Further, the calibration device 1410, and therefore the second light detector 1412, may be placed at a given location relative to the screen 102. This location may correspond to one or more perspectives relative to the screen 102. Therefore, from at least one location on each of the convex reflective elements, one of the light rays occurring during the sequential scan will be reflected toward, subsequently intercepted by, and detected by the second light detector 1412. Data, with respect to time, about these reflected light rays (e.g., intensity or wavelength) may be recorded and/or transmitted by the calibration device 1410. In some embodiments, this data with respect to time may be recorded in the form of a measured intensity profile.

In addition, there may be one or more light beams that are intercepted by the first light detector 1414. The first light detector 1414 may be the same type of detector as the second light detector 1412, or they may be different from one another, in various embodiments. Data with respect to time about the intercepted light beam(s) (e.g., intensity) may also be recorded and/or transmitted by the calibration device 1410. In some embodiments, this data with respect to time may be recorded in the form of an intercepted intensity profile.

As illustrated, the light rays reflected from the convex reflective elements on the screen 102 represent various points in time (i.e., the light rays are being reflected toward the second light detector 1412 at different times during the calibration method, but are illustrated together in FIG. 14a). The light beam from the projection unit 110 of the light field projection system that is intercepted by the first light detector 1414 also represents a point in time, which is not necessarily concurrent with any of the reflected light rays being measured by the second light detector 1412. The light rays and light beam are depicted together for the purpose of illustration. Further, while the light rays reflected from the convex reflective elements are transmitted by the projection unit 110, the portion of each ray extending from the projection unit 110 to the screen 102 is omitted from FIG. 14a to reduce clutter in the illustration.

Additionally, the calibration method may include a control system (e.g., a control system of the light field projection system or within the calibration device 1410) making determinations based on the data from the reflected light rays (e.g., the measured intensity profile) and the data from the detected intercepted light beam (e.g., the intercepted intensity profile). The control system may alternatively be a control system remotely located, such as a processing unit of a cloud server with which some or all of the local components communicate. If the control system is within the light field projection system, this data may be transmitted from the calibration device 1410 to the light field projection system prior to the determinations being made. The determinations may include determining a location of the calibration device 1410 (e.g., establishing a set of coordinates that correspond to a horizontal position and a vertical position of the second light detector 1412). Such a location may be determined based on the intercepted intensity profile and the baseline intensity profile according to which the light from the projection unit 110 was modulated. In some embodiments, such locations may also be determined based on a travel time of light from the projection unit 110 to the first light detector 1414.

Further, the control system may compare the measured intensity profile measured by the second light detector 1412 to an expected intensity profile. The expected intensity profile may be based on the baseline intensity profile according to which the light from the projection unit 110 was modulated and the location of the calibration device 1410 (e.g., the set of coordinates that correspond to the horizontal position and the vertical position of the second light detector 1412).

To fulfill the objective of the calibration, an operation of a control system of the light field projection system, wherein the control system determines a light field modulation scheme for projecting a light field using the light field projection system that is concurrently viewable from a plurality of perspectives, may be modified. The modification may be made in response to any differences between the measured intensity profile and the expected intensity profile that were identified when the two profiles were compared. Such modification can include altering a modulation scheme, for use by a projection unit of the light field projection system, by adding or removing one or more time delays, for example. Altering the modulation scheme may additionally or alternatively include increasing or decreasing the intensity output by the projection unit at various times of the modulation scheme. Further, altering the modulation scheme may include increasing or decreasing the wavelength of light transmitted by the projection unit at various times of the modulation scheme.

As illustrated by the dashed arrows in FIG. 14a, this process can be repeated for multiple locations (e.g., multiple horizontal and/or vertical locations) of the calibration device 1410. Such multiple locations may allow for the calibration of multiple viewing perspectives of the second light detector 1412 relative to the screen 102. For example, calibrating for two perspectives relative to the screen 102 separated by a distance corresponding to the distance between a viewer's eyes could allow for a calibrated projection of a light field that is binocularly/stereoscopically viewable to produce a 3D image. The distance between two separate calibration locations may alternatively correspond to a predefined resolution of the calibration method. Even further, the separation could correspond to the width of a typical human pupil under specific lighting conditions at a specific distance from the screen 102.

Similar to an acoustic method used by an audiophile who tweaks the transfer function of a sound system to obtain increased fidelity at specific listening locations within a space, the method of calibration could be repeated for each of a number of predetermined perspectives (i.e., "hot spots") from which light fields produced by the light field projection system will be viewed. In some cases, the calibration could be repeated for each possible viewable perspective to calibrate each possible viewing perspective.

Further, depending on the orientation of a user holding the calibration device 1410, for example, some of the paths of projection between the projection unit 110 and the screen 102 may be occluded by the user during calibration. Thus, the calibration may be repeated with the user holding the calibration device 1410 at a different angle or from a different side (e.g., the user holds the calibration device in their outstretched right hand the first time and in their outstretched left hand the second time) so that the full screen (e.g., the full field of view of the second light detector) can be calibrated.

In some embodiments, calibrating a single perspective relative to the screen 102 may be enough to determine macro-orientation shifts (e.g., rotations) of the screen 102. Thus, regions of the screen 102 from which light was not reflected toward the second light detector 1412 during calibration may still be calibrated using the solitary perspective. This may be the case, for example, if the screen 102 is sufficiently rigid and resistant to damage so as to negate a possibility of bending or scratching of the screen 102. Thus, from a single calibration measurement for a single perspective, the location of each, and any rotational offset of each, of the convex reflective elements relative to the projection unit 110 can be deduced.

The second light detector 1412 (or the first light detector 1414) may be a photodiode (allowing for a substantial signal-to-noise ratio), an avalanche photodiode, or a photoresistor, in various embodiments. Alternatively, the second light detector 1412 (first light detector 1414) may be a variety of other devices (e.g., a digital camera), in various embodiments. The second light detector 1412 (first light detector 1414) may be configured to output a voltage and/or a current signal to a control system that corresponds to a light intensity value. The voltage and/or current signal may vary with respect to time as the light intensity incident on the second light detector 1412 (first light detector 1414) changes. For example, if the second light detector 1412 (first light detector 1414) is a photodiode, light incident on the second light detector 1412 (first light detector 1414) may excite charge within the second light detector 1412 (first light detector 1414). The excited charge may be separated between two terminals of the second light detector 1412 (first light detector 1414), thus manifesting the light intensity incident on the second light detector 1412 (first light detector 1414) as a voltage differential across the two terminals.

In addition to or alternative to being configured to detect light intensity, the second light detector 1412 (first light detector 1414) may be configured to detect a wavelength of light reflected from the screen 102 (or intercepted by the first light detector 1414). As illustrated in FIG. 14a, the second light detector 1412 could receive light reflected from a location on each of the convex reflective elements at different times during the sequential scan. Additionally or alternatively, the second light detector 1412 (first light detector 1414) may include multiple light-sensitive elements (e.g., in a sensor array of a charge-coupled device—CCD). The multiple light-sensitive elements may be spread out horizontally or vertically.

The first light detector 1414 may have an aperture smaller than an aperture of the second light detector 1412. A smaller aperture may allow for the first light detector 1414 to provide a higher temporal resolution of a detected light beam, which could ultimately correlate to a higher spatial resolution associated with the determined location of the calibration device 1410. The first light detector 1414 may face in a direction that is rotated 180 degrees with respect to the second light detector 1412. In some alternate embodiments, however, (e.g., if the screen is offset from the projection unit), the first light detector could be rotated with respect to the second light detector by more or less than 180 degrees (e.g., 210 degrees)

The transmitter 1416 may serve to transmit the data measured by the second light detector 1412, the first light detector 1414, or the time piece 1418. This data may be transmitted to a control system that processes the data in order to continue the calibration process. In some embodiments, there may instead be an onboard control system or processing unit that processes this data, and then the transmitter 1416 transmits the result (e.g., the time points in a modulation scheme in which an addition or removal of time delays should be placed, and the duration of those time delays) to a control system which determines the modulation scheme. In such embodiments, the calibration device may further include a receiver. The receiver may receive data used in the calibration (e.g., data used by the control system, which is not measured by the second light detector or the first light detector, to determine if a modulation scheme should be altered, such as a baseline intensity profile). Additionally or alternatively, in embodiments where the calibration device has an onboard control system, the calibration device could include a memory (e.g., flash memory) in which data used in the calibration (e.g., a baseline intensity profile) may be stored.

The transmitter 1416 may be a wireless transmitter capable of communicating using radio waves (e.g., a radio antenna) or communicating using WiFi (IEEE 802.11 standards), in various embodiments. In other embodiments, the transmitter 1416 may communicate wirelessly using Bluetooth®. In still other embodiments, the transmitter 1416 may be connected using a wireline connection to a receiver (i.e., the transmitter 1416 could be tethered to the corresponding receiver). For example, the transmitter 1416 may communicate data to a computing device, which performs at least some of the steps of the calibration method, over a USB cable.

The time piece 1418 may be used in conjunction with the second light detector 1412 and/or the first light detector 1414 to establish the time points at which certain light intensities are detected (e.g., the time points at which all the reflected light rays are reflected from the screen 102 and detected by the second light detector 1412). The time piece 1418 can, therefore, be used in the determination of a light intensity profile corresponding to the light measured by the second light detector 1412 or the first light detector 1414. Further, the time piece 1418 may be used to track the travel time of light from the projection unit 110 to the first light detector 1414 or the second light detector 1412. The time piece 1418 may be a digital clock (e.g., an atomic clock) or a quartz oscillator, in various embodiments. Other time pieces are also possible.

In some embodiments, however, the time piece may be internal to the second light detector or the first light detector. Alternatively, there may be multiple time pieces internal to the various components of the calibration device. Even further, in embodiments where there is a control system internal to the calibration device, the time piece may be built into the control system and the control system may be connected to the other components of the calibration device through a communications bus. In still other embodiments, there may be no time piece in the calibration device, and the transmitter may relay messages to a control system having a remote location relative to the calibration device, and using the arrival time of those messages, the remotely located control system may determine when the measurements were made by the second light detector and/or the first light detector.

Figure 14B:
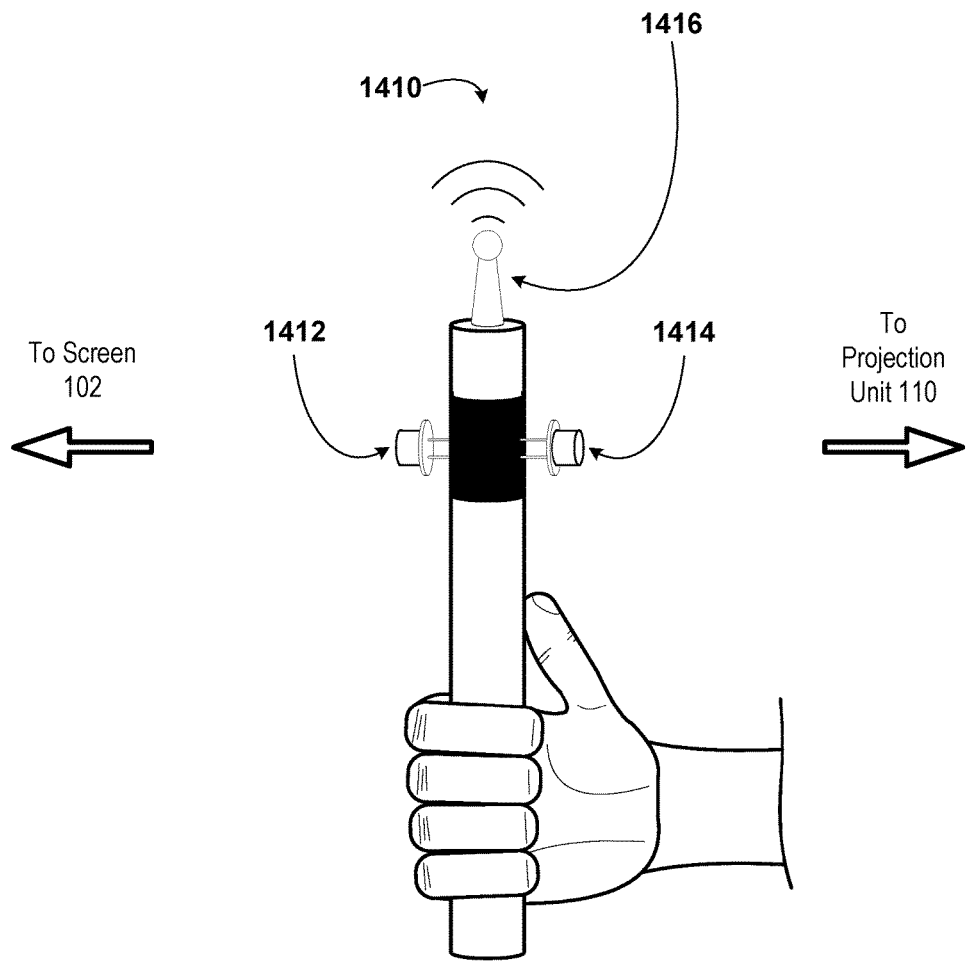
FIG. 14b is an illustration of a calibration device being used in a calibration method, according to example embodiments.

FIG. 14b is an illustration of a calibration device, according to an example embodiment. The calibration device 1410 may be the calibration device 1410 illustrated using symbols in FIG. 14a. Therefore, the calibration device 1410 may include the second light detector 1412, the first light detector 1414, and the transmitter 1416. The calibration device 1410 may further include the time piece 1418 interior to the body of the calibration device 1410. As indicated, the second light detector 1412 may face the screen 102 and the first light detector 1414 may face the projection unit 110 during calibration. In some embodiments, after a calibration of one perspective has occurred, the calibration device 1410 may be rotated or moved to a second perspective relative to the screen 110, and the calibration steps may be repeated for a second perspective.

As illustrated, the calibration device 1410 may be a handheld device (e.g., a wand), in some embodiments. In other embodiments, the calibration device 1410 may be mounted on a base or a wall relative to a screen (e.g., the screen 102 illustrated in FIG. 14a) and a projection unit (e.g., the projection unit 110 illustrated in FIG. 14a). For example, the calibration device 1410 could be put on a stand at a center location of an environment relative to the screen 102. Alternatively, the calibration device 1410 could be attached to or built into a mobile unit, such as a mobile robotic device. In such a way, the mobile robotic device could roam around a projection area relative to the screen 102 and perform calibration from various perspectives. Even further, the calibration device could be built into a wearable device for use by a viewer of the light field projection system. For example, each viewer could wear a pair of calibration glasses that have a calibration device in them, or have several calibration devices in them (e.g., one for each eye). As such, in some embodiments of the calibration device, the calibration device can be shaped differently than illustrated in FIG. 14b. Using the calibration glasses, the light field projection system could calibrate for solely those locations/perspectives that were being viewed at a given time. Such a technique may require less bandwidth/processing power than other potential calibration techniques.

In some embodiments, the calibration device 1410 may have additional components that are not illustrated in FIG. 14b. For example, the calibration device 1410 may have an energy source (e.g., one or more batteries or a corded connection to a wall socket). Such an energy source may provide energy used in the operation of the second light detector 1412, the first light detector 1414, the transmitter 1416, the time piece 1418, or an onboard control system.

In some embodiments, the sequential scan of the screen 102 by the projection unit 110 may occur at such a rate that the calibration device 1410 can be approximated as stationary during the time duration of the scan. However, as determining the precise location of the second light detector 1412 may be critical for a high resolution calibration, determining if and when the calibration device 1410 moved during calibration may also be useful. As such, the calibration device 1410 may also have an accelerometer (e.g., connected to the transmitter 1416 or an onboard control system). The accelerometer may measure the acceleration of the calibration device 1410 with respect to time in order to track any motion of the calibration device 1410. The tracked motion can be used by a control system to deconvolve the motion of the calibration device 1410 from the measured intensity profiles, thereby determining profiles of light detected by the second light detector 1412 that may more accurately represent the light being transmitted by the projection unit 110 and reflected from the convex reflective elements on the screen 102.

Figure 14C:
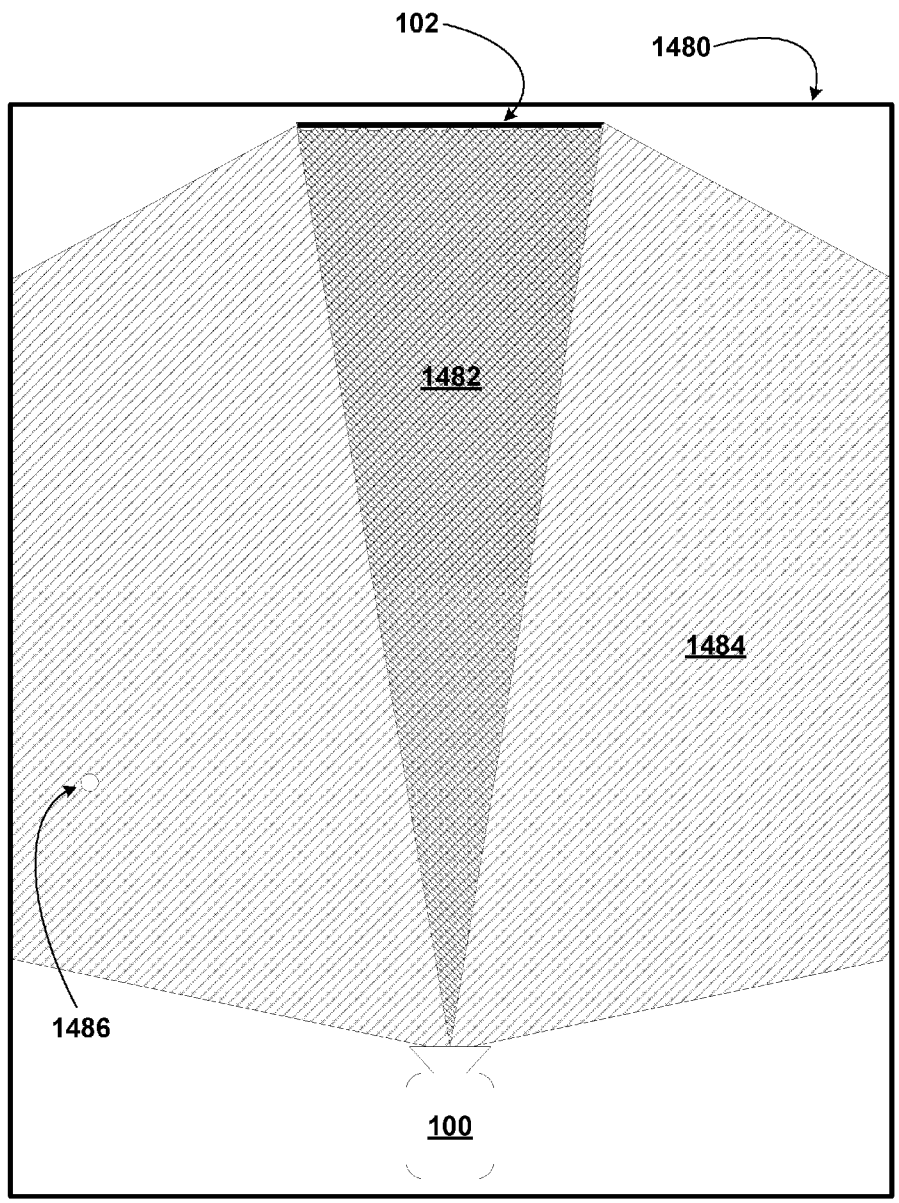
FIG. 14c is an illustration of a calibration method, according to example embodiments.

FIG. 14c is an illustration of a calibration method, according to example embodiments. The calibration method illustrated in FIG. 14c may correspond to a top-view of the calibration method illustrated in FIG. 14a. For example, FIG. 14c may represent one or more sweeps 1482, 1484 performed by the projection unit 100. The location of the calibration device 1410 illustrated in FIG. 14a may be one of a set of one or more locations calibrated during the calibration method illustrated in FIGS. 14a and 14c.

As illustrated in FIG. 14c, the screen sweep area 1482 swept out by the projection unit 100 during one sweep of the screen represents the regions between the projection unit 100 and the screen 102 where light is projected by the projection unit 100 prior to the light reflecting from the screen 102. The viewable sweep area 1484 overlaps and includes the screen sweep area 1482, and represents the locations within the space 1480 of viewable perspectives relative to the screen 102. The viewable sweep area 1484 may also swept out by the projection unit 100 when calibrating for perspectives not overlapping with the screen sweep area 1482.

For example, location 1486 is a perspective relative to the screen 102 from which the light field projected by the projection unit 110 may be viewed. In order to calibrate for this location, the projection unit 100 may sweep out the viewable sweep area 1484. This sweep may be performed instead of or in addition to the sweep of the screen sweep area 1482. In some embodiments, the projection unit may sweep out the entire viewable sweep area 1484 using light modulated according to a baseline intensity profile, where only a portion of the light is reflected from the screen 102 (e.g., the portion of the light that is projected in the portion of the viewable sweep area 1484 corresponding to the screen sweep area 1482).

Alternatively, the projection unit 100 may sweep out the viewable sweep area 1484 using light of a different wavelength range (e.g., infrared) or a different intensity range (e.g., lower intensities) than the light projected by the projection unit 100 to sweep out the screen sweep area 1482. Again, this light may be modulated according to a baseline intensity profile so that it may be calibrated using a calibration device (e.g., the calibration device 1410 illustrated in FIGS. 14a and 14b).

Figure 15A:
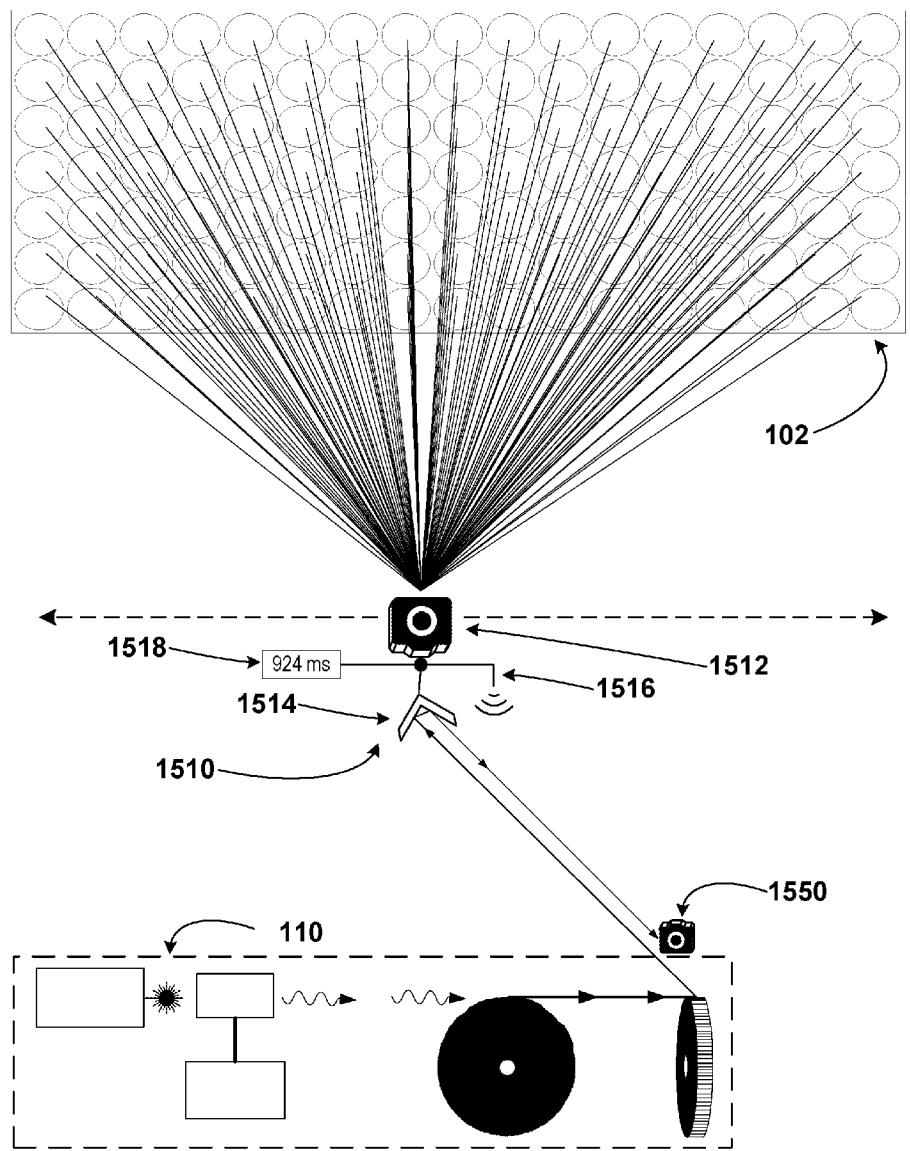
FIG. 15a is an illustration of a calibration method, according to example embodiments.

FIG. 15a is an illustration of a calibration method, according to an example embodiment. FIG. 15a depicts a light field projection unit 110 of a light field projection system sequentially scanning a screen 102. The light used to scan the screen 102 may be infrared (e.g., having an electromagnetic wavelength between 750 and 2,500 nm), for example, so as not to be visible by a viewer of the light field projection system. FIG. 15a also includes a calibration device 1510. The calibration device 1510 illustrated in FIG. 15a may be analogous, but not identical, to the calibration device 1410 illustrated in FIG. 14a. The calibration device 1510 may include a second light detector 1512, a mirrored element 1514, a transmitter 1516, and a time piece 1518. In addition, as illustrated in FIG. 15a, the calibration device 1510 may also be a part of a calibration system. The calibration system may further include a first light detector 1550 on the projection unit 110. In some embodiments, the mirrored element 1514 may be facing the first light detector 1550.

The calibration method illustrated in FIG. 15a may proceed in much the same manner as described above with respect to FIG. 14a, with analogous components performing analogous tasks (e.g., the second light detector 1512 of FIG. 15a performs similar actions to the second light detector 1412 of FIG. 14a). A substantive difference, however, involves the way in which the one or more intercepted light beams are processed. When a light beam from the light field projection unit 110 is intercepted by the calibration device 1510, the light beam may be reflected by the mirrored element 1514. In some embodiments, the mirrored element 1514 may be a retroreflector (e.g., one or more corner reflectors). In such embodiments, the light beam would be redirected in the direction from which the light beam originated. As such, the first light detector 1550 may be located near an aperture of the projection unit from which the light beam is emitted.

Similar to the first light detector 1414 illustrated in FIG. 14a, the first light detector 1550 may then detect the intercepted light beam. Data about the intercepted light beam(s) with respect to time (e.g., an intercepted intensity profile) may also be recorded and/or transmitted. In order to detect timing, the first light detector 1550 may have an onboard timing unit or may communicate with a separate timing unit (e.g., a timing unit of a control system of the light field projection system). Further, the first light detector 1550, or an associated timing unit or control system, may also account for the travel time required by the light to travel to and from the calibration device 1510. This may be done based on the intensity of the measured light beam and the baseline intensity profile according to which the projection unit is modulating light. In some embodiments, this data with respect to time may be recorded in the form of an intercepted intensity profile. Further, as in FIG. 14a, the calibration method may include a control system making determinations and modifications based on the intercepted light beam, the measured intensity profile (e.g., transmitted from the calibration device 1510 to the control system by the transmitter 1516), and the baseline intensity profile.

As illustrated by the dashed arrows, and similar to the embodiment of FIG. 14a, this process can be repeated for multiple locations (e.g., horizontal and/or vertical locations) of the calibration device 1510. Such multiple locations may allow for the calibration of multiple viewing perspectives of the second light detector 1512 relative to the screen 102.

Figure 15B:
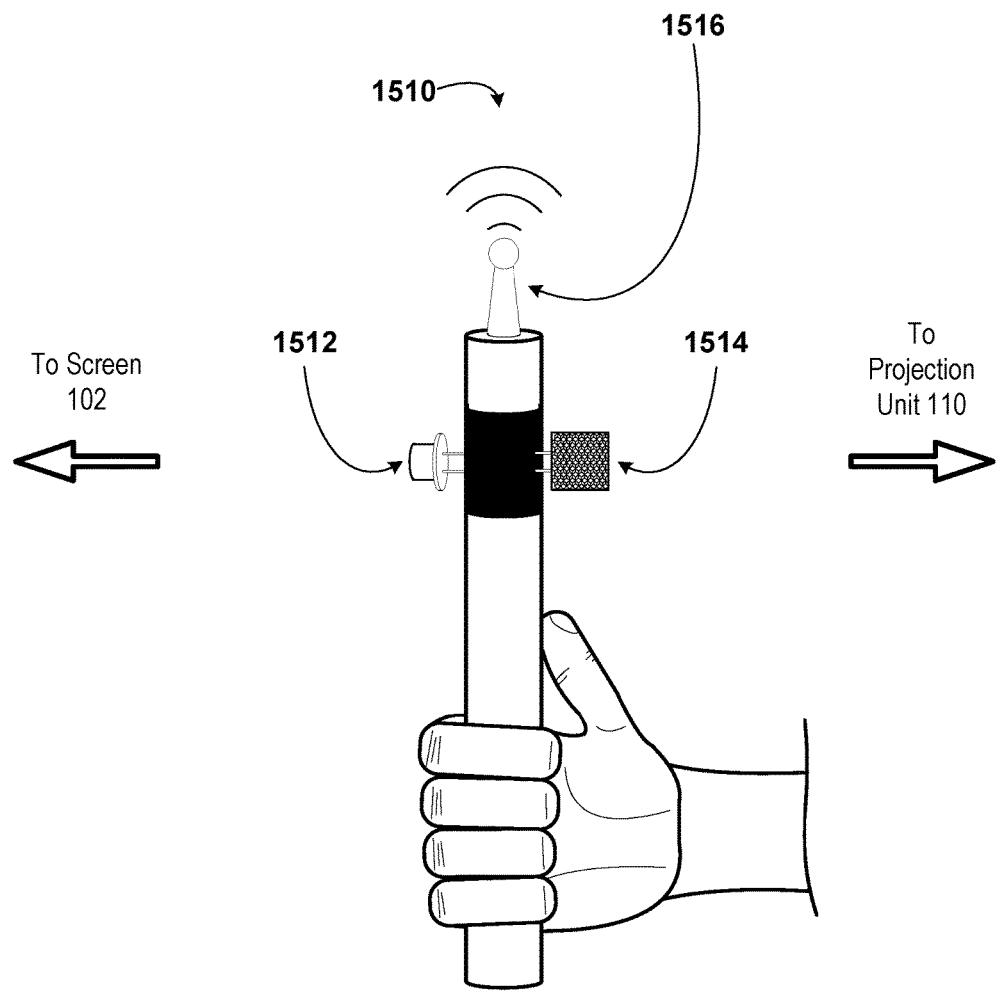
FIG. 15b is an illustration of a calibration device being used in a calibration method, according to example embodiments.

FIG. 15b is an illustration of a calibration device 1510 being used in a calibration method, according to an example embodiment. The calibration device 1510 may be the calibration device 1510 illustrated using symbols in FIG. 15a. As such, the calibration device 1510 may also be a part of a calibration system, the calibration system including the first light detector 1550. Similar to the calibration device 1410 illustrated in FIG. 14b, the calibration device 1510 may be a handheld device (e.g., a wand). Also similar to the calibration device 1410 illustrated in FIG. 14b, many other shapes, styles, and orientations for the calibration device 1510 are also possible. Further, the calibration device 1510 illustrated in FIG. 15b could include any of the one or more additional components described with respect to the calibration device 1410 illustrated in FIG. 14b (e.g., an energy source or an accelerometer).

The components of the calibration device 1510 illustrated in FIG. 15b, with the exception of the mirrored element 1514, may be similar to those components illustrated in FIG. 14b. As described above, the mirrored element 1514 may be a retroreflector (e.g., a retroreflector that only reflects light beams having a wavelength within a predefined spectral range), such as a set of corner reflectors (as illustrated in FIG. 15b). In alternate embodiments, the retroreflective may instead be a phase-conjugate mirror. In some embodiments, the mirrored element may be a planar or curved mirror, and may be mounted on a stage that can translate and or rotate to face the first light detector 1550, for example. This may allow, without the use of a retroreflector, the intercepted light beam to be reflected toward the first light detector 1550 irrespective of the position of the calibration device relative to the projection unit 110.

Figure 16A:
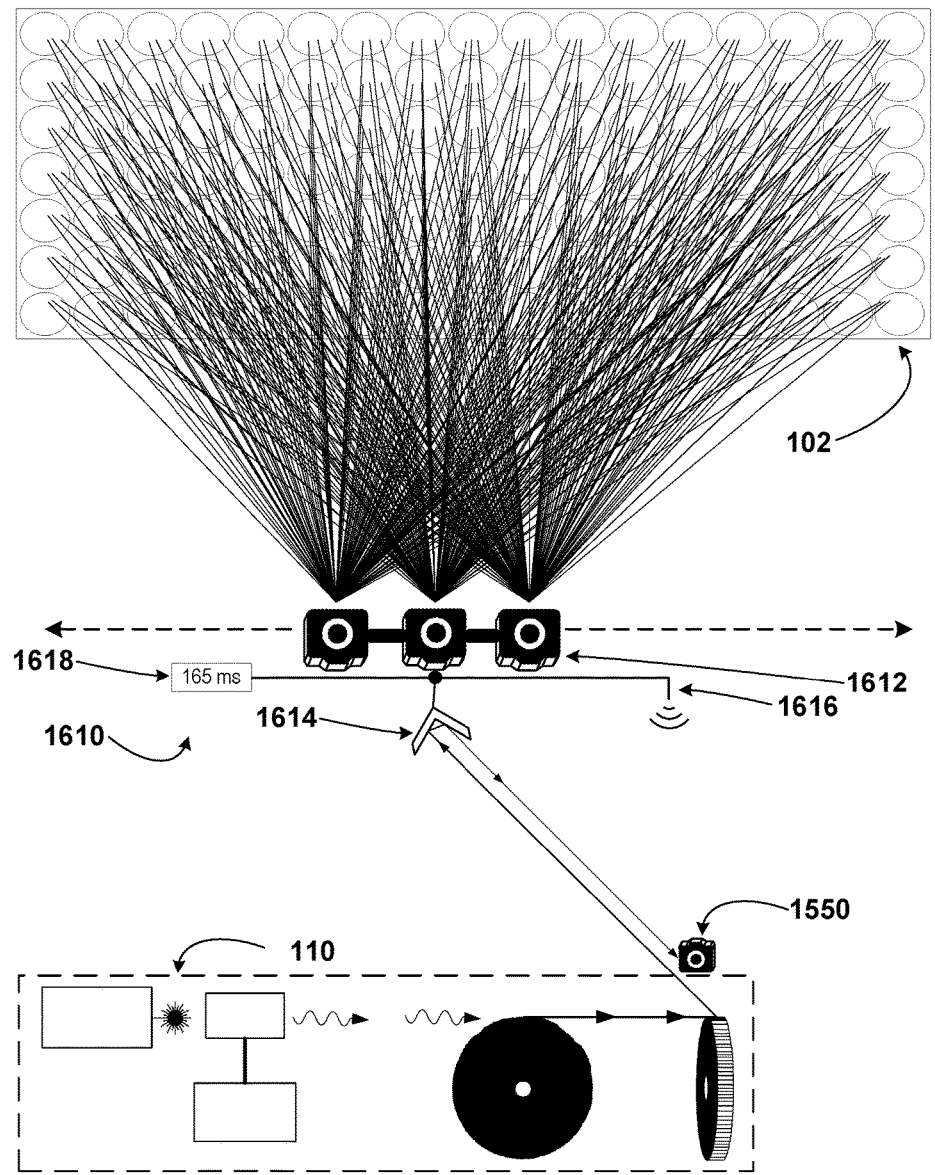
FIG. 16a is an illustration of a calibration method, according to example embodiments.

FIG. 16a is an illustration of a calibration method, according to an example embodiment. FIG. 16a depicts a light field projection unit 110 of a light field projection system sequentially scanning a screen 102. The light used to scan the screen 102 may be infrared (e.g., having an electromagnetic wavelength between 750 and 2,500 nm), for example, so as not to be visible by a viewer of the light field projection system. FIG. 16a also includes a calibration device 1610. The calibration device 1610 illustrated in FIG. 16a may be analogous, but not identical, to the calibration device 1510 illustrated in FIG. 15a. The calibration device 1610 may include a mirrored element 1614, a transmitter 1616, and a time piece 1618. In addition, the calibration device 1610 may include an array of second light detectors 1612. Similar to the calibration system illustrated in FIG. 15a, the calibration device 1610 may also be a part of a calibration system. The calibration system may further include the first light detector 1550. In some embodiments, the mirrored element 1614 may be facing the first light detector 1550.

The calibration method illustrated in FIG. 16a may proceed in much the same manner as described above with respect to FIG. 15a, with analogous components performing analogous tasks (e.g., the mirrored element 1614 of FIG. 16a performs similar actions to the mirrored element 1514 of FIG. 15a). A substantive difference, however, involves the number of second light detectors 1612. In the embodiment illustrated in FIG. 16a the calibration device 1610 includes an array of three second light detectors 1612. Each of the second light detectors 1612 may be at a different perspective relative to the screen 102 (as illustrated by the reflected rays detected by each of the second light detectors 1612 coming from different regions of the convex reflective elements). As such, the calibration device 1610 may be capable of calibrating for three perspectives per sequential scan by the projection unit 110. In other embodiments, there may be more (e.g., 5, 10, 50, 100, etc.) or fewer (e.g., 2) second light detectors arranged in the calibration device. Further, in embodiments with multiple second light detectors, the second light detectors may be arranged in a variety of different patterns (e.g., a cross or a 2D plane). Still further, second light detectors may be arranged in a 3D array, thereby allowing the calibration device to monitor how distance from the screen affects intensity of light reflected from the screen. If, for example, a viewing area was foggy, the calibration device may be able to detect this and account for it by increasing the intensity of a light field modulation scheme at certain times corresponding to certain reflection angles from the screen.

In order to use the measured intensity profiles associated with each of the second light detectors 1612, the location of each of the second light detectors 1612 may be determined. This determination may be made by knowing the location of each of the second light detectors 1612 relative to the mirrored element 1614, and then using the detection of the intercepted light beam to determine the location of the mirrored element 1614 relative to the projection unit 110. Further, a separate expected intensity profile may be determined for each of the second light detectors 1612 by incorporating the location of each of the second light detectors 1612 with the baseline intensity profile used to modulate the light emitted by the projection unit 110. A control system may then compare the expected intensity profile associated with each of the second light detectors 1612 to the measured intensity profile associated with each respective second light detector 1612 to determine if a modification to the light field projection system (e.g., a control system that determines a modulation scheme for use by a modulator of the projection unit) should be made.

As illustrated by the dashed arrows, and similar to the embodiments of FIGS. 14a and 15a, this process can be repeated for multiple locations (e.g., multiple horizontal and/or vertical locations) of the calibration device 1610. Such multiple locations may allow for the calibration of multiple viewing perspectives of the second light detectors 1612 relative to the screen 102. For example, each additional location of the calibration device 1610 may allow for calibration of up to three additional perspectives relative to the screen 102.

Figure 16B:
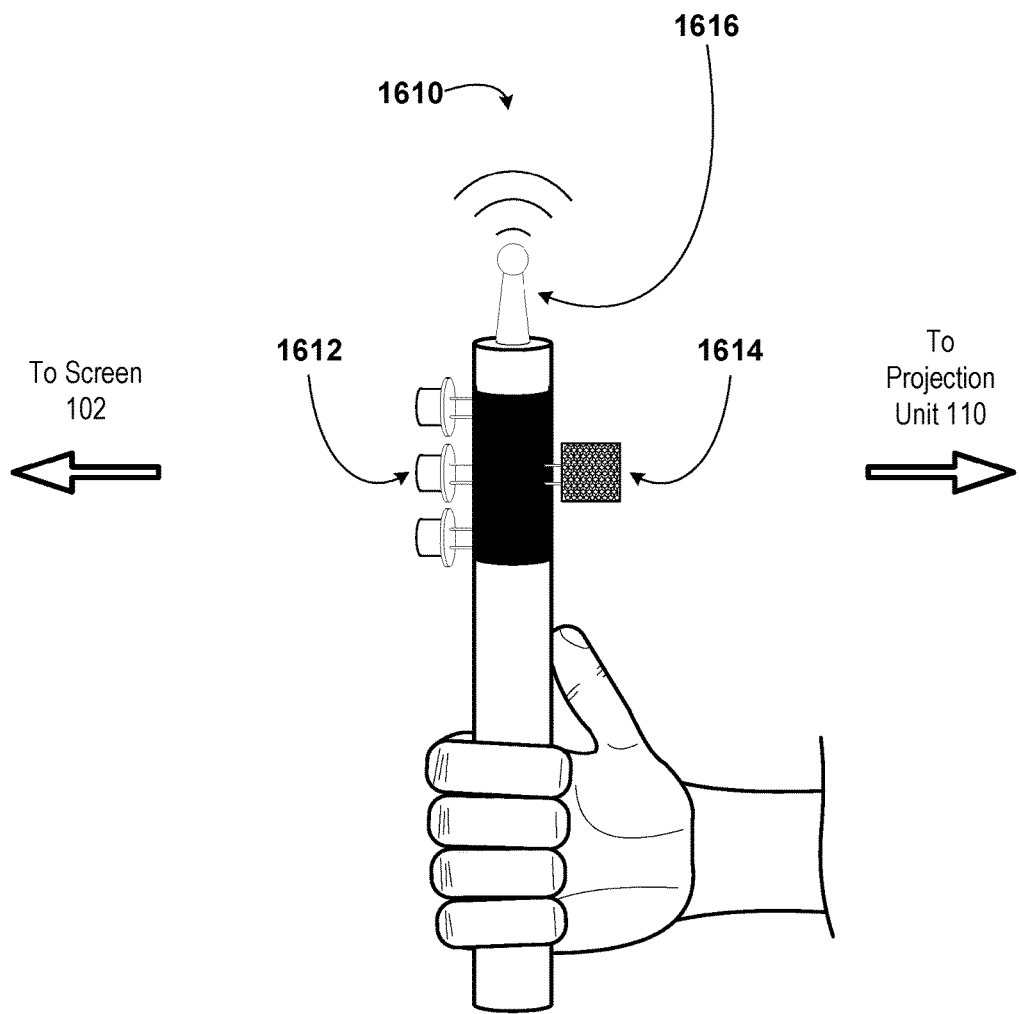
FIG. 16b is an illustration of a calibration device being used in a calibration method, according to example embodiments.

FIG. 16b is an illustration of a calibration device being used in a calibration method, according to an example embodiment. The calibration device 1610 may be the calibration device 1610 illustrated using symbols in FIG. 16a. As such, the calibration device 1610 may also be a part of a calibration system, the calibration system including the first light detector 1550. Similar to the calibration device 1410 illustrated in FIG. 14b, the calibration device 1610 may be a handheld device (e.g., a wand). Also similar to the calibration device 1410 illustrated in FIG. 14b, many other shapes, styles, and orientations for the calibration device 1610 are also possible. Further, the calibration device 1610 illustrated in FIG. 16b could include any of the one or more additional components described with respect to the calibration device 1410 illustrated in FIG. 14b (e.g., an energy source or an accelerometer).

In other embodiments than those illustrated in FIGS. 14a-16b, the calibration device may instead be a purely reflective component (e.g., a silvered rod) with no electrical components. In such embodiments, the second light detector(s) may be located on or near the screen (as opposed to on the calibration device), similar to the way in which the first light detector is located on or near the projection unit in some embodiments. In this way, the calibration device may be inexpensive to fabricate and replaceable.

In still other embodiments, the calibration device may be a refractive component (e.g., a rod lens or a spherical lens) with no electrical components. Given the transparent quality of such a calibration device, calibration systems that include such a calibration device may have the second light detector(s), as they were previously defined, located on or near the projection unit. Similarly, the first light detector, as it was previously defined, may be located on or near the screen. Further, some embodiments of the calibration device may include both a reflective section and a refractive section.

In the previously described embodiments, the reflective or refractive components may only reflect or refract in certain spectral ranges (i.e., at wavelengths within a certain wavelength range). Thus, the reflective or refractive components may act as bandpass filters. Such a filtering characteristic could allow for a calibration method that does not interfere with other perspectives, relative to the screen, in which a light field is being concurrently projected (e.g., a viewer of a light field being projected by the light field projection system may have a viewing experience uninhibited by a calibration method being concurrently performed).

Any of the above described calibration methods could be performed on a light field projection system having a screen that has concave refractive elements and a rear projection unit (as opposed to the screen with convex reflective elements and the front projection unit illustrated in FIGS. 14a, 15a, and 16a). In such embodiments, however, the locations of certain detectors may be modified. For example, in the embodiment of FIG. 14a, the first light detector may be rotated to instead face the screen, similar to the second light detector. A separate scan may be performed, either concurrently or separately, by the projection unit at a different wavelength (e.g., a wavelength at which the first light detector is sensitive, but the second light detector is not) in order to determine the location of the calibration device without interfering with the detection of the measured intensity profile by the second light detector. Similarly, the first light detector in such embodiments may not be sensitive to, or may filter out, the wavelength being measured by the second light detector to reduce interference of the projected light field with the location measurements. Adjustments similar to these may be made to the embodiments illustrated in FIGS. 15a and 16a when calibrating a light field projection system that has a screen that includes concave refractive elements.

In still further alternate embodiments, there may be no first light detector or mirrored element, used to intercept the light, on the calibration device. Such embodiments may include multiple second light detectors arranged in a 1D or 2D array, for example. Assuming a sufficient rigidity of the calibration device and the screen, the measurements made by the second light detectors may be sufficient to fully calibrate the light field projection system. Upon each of the second light detectors detecting corresponding measured intensity profiles, a control system could compare these intensity profiles with one another and with the expected intensity profiles to determine if a modification to a light modulation scheme (e.g., an addition or removal of a time delay) needs to be made. Such alternate embodiments to FIGS. 14a and 14b, FIGS. 15a and 15b, and FIGS. 16a and 16b are illustrated and described with reference to FIGS. 17a and 17b.

Figure 17A:
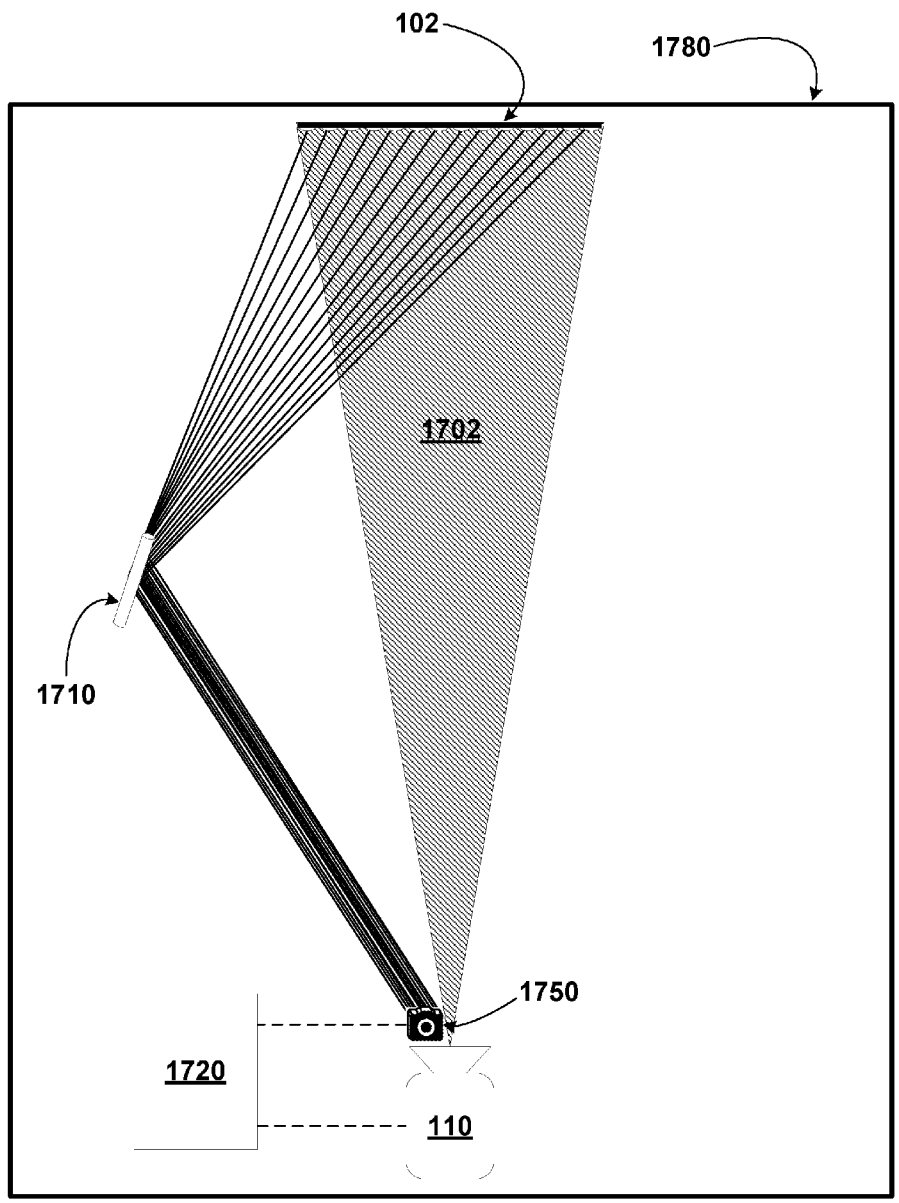
FIG. 17a is an illustration of a calibration method according to example embodiments.

FIG. 17a is an illustration of a calibration method, according to an example embodiment. FIG. 17a depicts a light field projection unit 110 of a light field projection system sequentially scanning a screen 102 by sequentially sweeping out an area 1702. The light used to scan the screen 102 may be infrared (e.g., having an electromagnetic wavelength between 750 and 2,500 nm), for example, so as not to be visible by a viewer of the light field projection system. FIG. 17a also includes a calibration device 1710. The calibration device 1710 illustrated in FIG. 17a may be a reflective or a refractive rod (e.g., a glass rod or a metallic rod, such as a 2 m long silvered rod). The calibration device 1710 may reflect and/or refract light reflected from the screen 102 to one or more perspectives within a space 1780. Further, the calibration device 1710 may reflect and/or refract the light toward a calibration light detector 1750. The calibration light detector 1750 may be connected to a computing device 1720 (e.g., a processor and/or a memory, such as an ASIC, GPU, or tensor processing unit, TPU) to communicate a received intensity profile to the computing device 1720. The computing device 1720 may further be connected to the projection unit 110 to transmit data to or receive data from the projection unit 110. The connection between the computing device 1720 and the calibration light detector 1750 could be wireless (e.g., over WiFi) or wireline (e.g., via a USB cable), similarly for the connection between the computing device 1720 and the projection 110. The calibration device 1710, the calibration light detector 1750, and the computing device 1720 may be a part of a calibration system, in some embodiments.

In alternate embodiments, the calibration device 1710 may have alternate shapes and/or sizes. For example, the calibration device could be shaped as a cross or a diamond. In addition, a larger calibration device may be capable of calibrating a larger number of viewable perspectives relative to the screen during one sweep of the area 1702 by the projection unit 110 and/or a higher resolution for the calibration.

The calibration method illustrated in FIG. 17a may include the projection unit 110 sweeping out the area 1702 with light according to a baseline intensity profile. This baseline intensity profile may be based on data stored within the computing device 1720. Additionally or alternatively, the baseline intensity profile may be transmitted from the projection unit 110 to the computing device 1720 before, during, or after the sweep of the area 1702 by the projection unit 110. During the sweep of the area 1702, light modulated according to the baseline intensity profile may be reflected from the screen 102 toward the calibration device 1710. For each perspective occupied by the calibration device 1710 (which may vary based on the size of the calibration device 1710), the calibration device 1710 may reflect or refract light reflected at one angle and location from each convex reflective element 104 (or concave refractive element in the case of a rear-projecting projection unit) on the screen 102 toward the calibration light detector 1750. This process of reflection from each convex reflective element 104 may occur for each sweep of the area 1702 by the projection unit 110.

Based on the temporal spacing of the reflected/refracted light received by the calibration light detector 1750, the calibration light detector 1750 and/or the computing device 1720 can form a detected intensity profile. Further, based on the baseline intensity profile, the detected intensity profile, and an a priori knowledge of the size, shape, and rigidity of the calibration device 1710, as well as the location of the screen 102, the computing device 1720 can back-out the location of the calibration device 1710, as well as any errors in the orientation of the screen 102 or abnormalities in the cleanliness, orientation, size, or shape of one or more of the convex reflective elements 104. This process can be repeated for different perspectives relative to the screen by moving the calibration device 1710 to a different location and re-executing the calibration method.

In some embodiments there may be "blind spots" where the light reflected from the screen cannot be reflected toward the calibration detector 1750 using the calibration device 1710, given the shape of the calibration device 1710. In such cases, the "blind spots" may be accounted for by slightly varying the position of the calibration device 1710 and re-executing the calibration method. In such a way, the light previously reflected toward the "blind spots" may now be reflected toward spots of the calibration device 1710 which can reflect light toward the calibration light detector 1750.

In some embodiments, the computing device 1720 may be configured to account for any motion by the calibration device 1710 during the calibration method. For example, if the calibration device 1710 is being held by a user who is moving the calibration device 1710 (either advertently or inadvertently) during the calibration method. This may be accounted for by the computing device 1720 evaluating the intensity profile of the calibration device 1710 and the known shape of the calibration device 1710 with Newtonian kinematic equations. Further, the computing device 1720 may be configured to account for any defects in the calibration device 1710 (e.g., scuffs or dents in the surface of the calibration device).

Figure 17B:
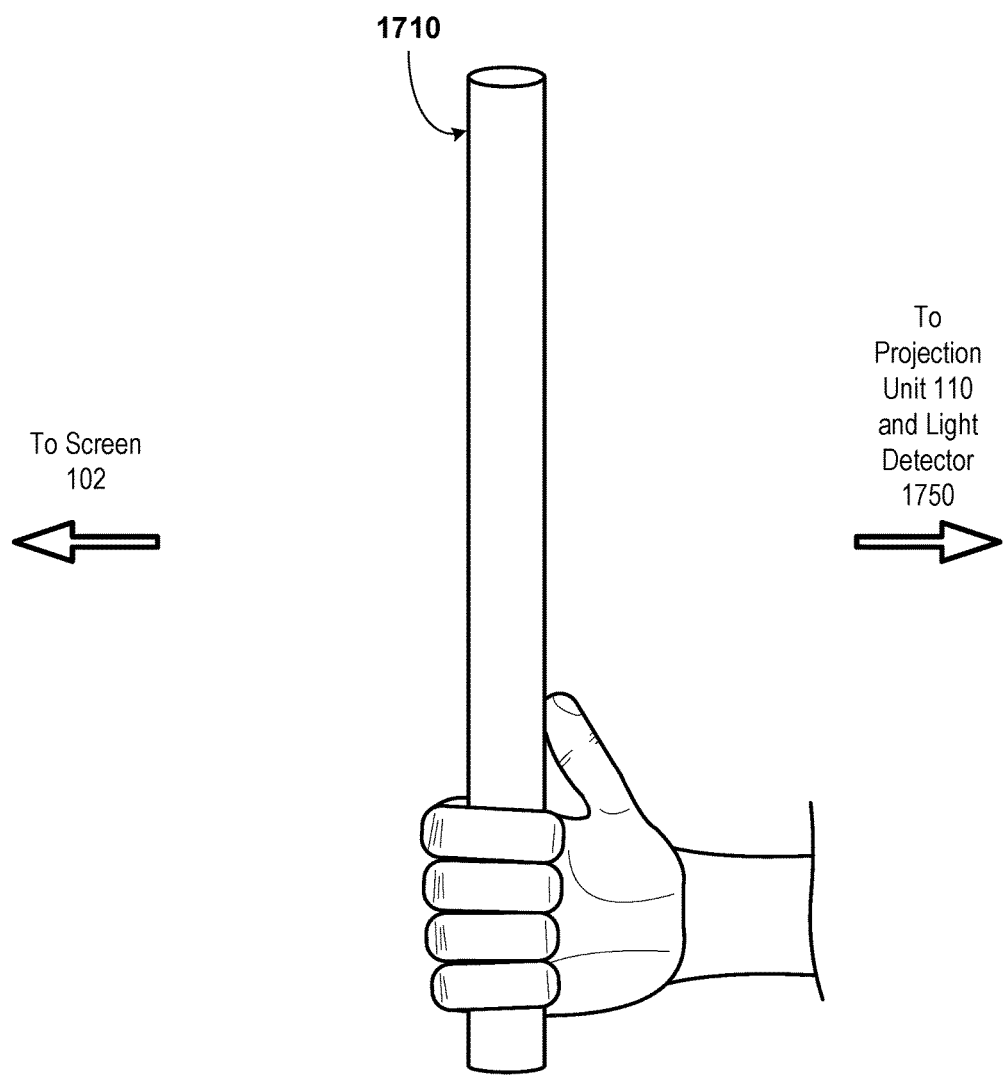
FIG. 17b is an illustration of a calibration device being used in a calibration method, according to example embodiments.

FIG. 17b is an illustration of a calibration device being used in a calibration method, according to an example embodiment. The calibration device 1710 may be the calibration device 1710 illustrated in FIG. 17a. As such, the calibration device 1710 may also be a part of a calibration system, the calibration system including the calibration light detector 1750 and the computing device 1720. Similar to the calibration device 1410 illustrated in FIG. 14b, the calibration device 1710 may be a handheld device (e.g., a wand or a rod). Also similar to the calibration device 1410 illustrated in FIG. 14b, many other shapes, styles, and orientations for the calibration device 1710 are also possible. Further, the calibration device 1710 illustrated in FIG. 17b could include any of the one or more additional components described with respect to the calibration device 1410 illustrated in FIG. 14b (e.g., an energy source, an accelerometer, or a transmitter).

Figure 18:
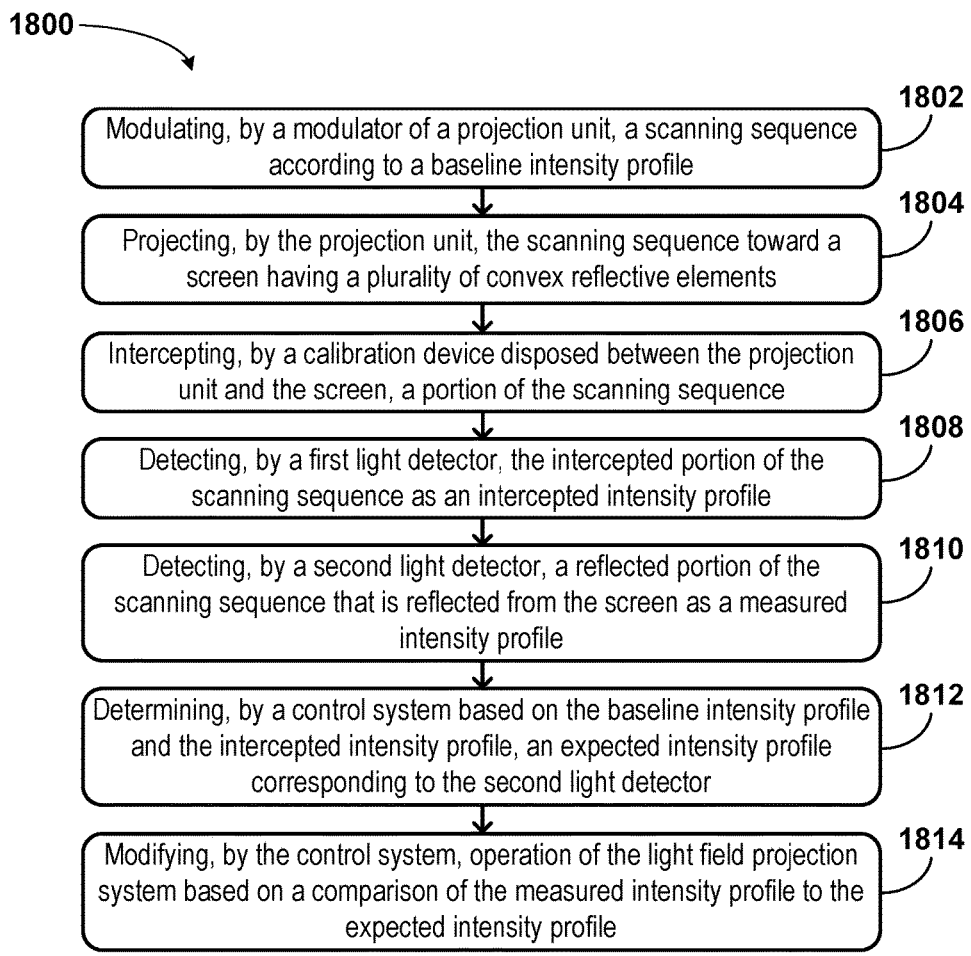
FIG. 18 is a flow chart illustration of a method, according to example embodiments.

FIG. 18 is a flow chart illustration of a method 1800, according to example embodiments. The method may be used to calibrate a light field projection system (e.g., the light field projection system 100 illustrated in FIG. 1).

Further, the light field projection system may include a screen (e.g., the screen 102 illustrated in FIG. 1) that has a plurality of convex reflective elements (e.g., the convex reflective elements 104 illustrated in FIG. 1). The method 1800 illustrated in FIG. 18 may be carried out by the devices and systems illustrated in any of FIGS. 14a-17, in various embodiments.

At step 1802, the method 1800 includes modulating, by a modulator of a projection unit, a scanning sequence according to a baseline intensity profile.

At step 1804, the method 1800 includes projecting, by the projection unit, the scanning sequence toward a screen having a plurality of convex reflective elements.

At step 1806, the method 1800 includes intercepting, by a calibration device disposed between the projection unit and the screen, a portion of the scanning sequence.

At step 1808, the method 1800 includes detecting, by a first light detector, the intercepted portion of the scanning sequence as an intercepted intensity profile.

At step 1810, the method 1800 includes detecting, by a second light detector, a reflected portion of the scanning sequence that is reflected from the screen as a measured intensity profile.

At step 1812, the method 1800 includes determining, by a control system based on the baseline intensity profile and the intercepted intensity profile, an expected intensity profile corresponding to the second light detector.

At step 1814, the method 1800 includes modifying, by the control system, operation of the light field projection system based on a comparison of the measured intensity profile to the expected intensity profile.

V. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

The orientation of the detectors or mirrored elements (e.g., screen-side, screen-facing, projection-side, projection-facing, etc.) as indicated by the drawings or the description should not be viewed as limiting to the claims. The detectors or mirrored elements described in the claims may be oriented in various ways in various embodiments.

What is claimed:

1. A system comprising:
   a projection unit operable to project a scanning sequence toward a screen having a plurality of convex reflective elements, wherein the projected scanning sequence is modulated according to a baseline intensity profile;
   a calibration device disposed between the projection unit and the screen such that a portion of the scanning sequence is intercepted by the calibration device before reaching the screen, wherein the calibration device comprises: (a) a first light detector arranged to detect the intercepted portion of the scanning sequence as an intercepted intensity profile, and (b) a second light detector arranged to detect a reflected portion of the scanning sequence that is reflected from the screen as a measured intensity profile; and
   a control system configured to:
   (a) determine, based on the baseline intensity profile and the intercepted intensity profile, an expected intensity profile corresponding to the second light detector; and
   (b) modify operation of a light field projection system based on a comparison of the measured intensity profile to the expected intensity profile.

2. The system of claim 1, wherein the second light detector is located at a perspective relative to the screen.

3. The system of claim 2, wherein the perspective corresponds to a unique set of coordinates including a horizontal position and a vertical position relative to the screen.

4. The system of claim 2, wherein the perspective corresponds to a perspective of a viewer's eye relative to the screen, and wherein a location of the viewer's eye is being tracked by the light field projection system.

5. The system of claim 1, further comprising one or more additional light detectors each arranged to detect an additional reflected portion of the scanning sequence that is reflected from the screen as an additional measured intensity profile, wherein the control system is further configured to determine an additional expected intensity profile for each of the one or more additional detectors.

6. The system of claim 1, wherein each additional light detector is located at a different perspective relative to the screen from each other additional light detector and the second light detector.

7. The system of claim 1, wherein the first light detector is arranged to face the projection unit.

8. The system of claim 1, wherein the second light detector is arranged to face the screen.

9. The system of claim 1, wherein the calibration device further comprises a mirrored element arranged to face the projection unit, and wherein the mirrored element is further arranged to reflect the intercepted portion of the scanning sequence toward to the first light detector.

10. The system of claim 1, wherein the control system is configured to modify operation of the light field projection system by modifying a control system of the projection unit, wherein the control system of the projection unit is configured to determine a light field modulation scheme for use by a modulator of the projection unit to project a light field that is concurrently viewable from a plurality of perspectives.

11. The system of claim 10, wherein the control system is configured to modify the control system of the projection unit by altering the light field modulation scheme.

12. The system of claim 11, wherein altering the light field modulation scheme comprises adding or removing one or more time delays from the light field modulation scheme.

13. The system of claim 11, wherein altering the light field modulation scheme comprises increasing or decreasing a light intensity at one or more times in the light field modulation scheme.

14. The system of claim 1, wherein the scanning sequence is projected using light of a wavelength not within the visible spectrum.

15. The system of claim 1, wherein the baseline intensity profile corresponds to a specialized light field projected for calibration.

16. The system of claim 1, further comprising a transmitter configured to transmit the measured intensity profile or the intercepted intensity profile to the control system.

17. The system of claim 1, further comprising an accelerometer configured to track any motion of the calibration device, wherein the tracked motion can be used by the control system to deconvolve the motion of the calibration device from the measured intensity profile.

18. A device configured to calibrate a light field projection system, the device comprising:
   a first light detector arranged to detect an intercepted portion of a scanning sequence as an intercepted intensity profile, wherein the scanning sequence is projected by a projection unit toward a screen having a plurality of convex reflective elements, and wherein the projected scanning sequence is modulated according to a baseline intensity profile;

a second light detector arranged to detect a reflected portion of the scanning sequence that is reflected from the screen as a measured intensity profile; and a transmitter configured to transmit the measured intensity profile and the intercepted intensity profile to a control system, wherein the control system is configured to determine, based on the baseline intensity profile and the intercepted intensity profile, an expected intensity profile corresponding to the second light detector, and wherein the control system is configured to modify operation of the light field projection system based on a comparison of the measured intensity profile to the expected intensity profile.

19. A method of calibrating a light field projection system, comprising:

modulating, by a modulator of a projection unit, a scanning sequence according to a baseline intensity profile;

projecting, by the projection unit, the scanning sequence toward a screen having a plurality of convex reflective elements;

intercepting, by a calibration device disposed between the projection unit and the screen, a portion of the scanning sequence;

detecting, by a first light detector, the intercepted portion of the scanning sequence as an intercepted intensity profile;

detecting, by a second light detector, a reflected portion of the scanning sequence that is reflected from the screen as a measured intensity profile;

determining, by a control system based on the baseline intensity profile and the intercepted intensity profile, an expected intensity profile corresponding to the second light detector; and modifying, by the control system, operation of the light field projection system based on a comparison of the measured intensity profile to the expected intensity profile.

20. The method of claim 19, further comprising reflecting, by a mirrored element, the intercepted portion of the scanning sequence.

* * * * *